United States Patent
Ikeda et al.

(10) Patent No.: US 12,483,686 B2
(45) Date of Patent: Nov. 25, 2025

(54) THREE-DIMENSIONAL-IMAGE DISPLAY DEVICE AND IMAGE GENERATION DEVICE

(71) Applicant: Shanghai AVIC Optoelectronics Co., Ltd., Shanghai (CN)

(72) Inventors: Naoyasu Ikeda, Kanagawa (JP); Tetsushi Sato, Kanagawa (JP)

(73) Assignee: Shanghai AVIC Optoelectronics Co., Ltd., Shanghai (CN)

( * ) Notice: Subject to any disclaimer, the term of this patent is extended or adjusted under 35 U.S.C. 154(b) by 0 days.

(21) Appl. No.: 18/964,930

(22) Filed: Dec. 2, 2024

(65) Prior Publication Data

US 2025/0211724 A1 Jun. 26, 2025

(30) Foreign Application Priority Data

Dec. 20, 2023 (JP) ................. 2023-215168

(51) Int. Cl.
*H04N 13/324* (2018.01)
*G02F 1/1362* (2006.01)
*H04N 13/322* (2018.01)

(52) U.S. Cl.
CPC ..... *H04N 13/324* (2018.05); *G02F 1/136286* (2013.01); *H04N 13/322* (2018.05)

(58) Field of Classification Search
CPC ........ G01S 7/20; G03B 35/18; H04N 13/324; H04N 13/322; G02F 1/136286
USPC .......................................................... 348/51
See application file for complete search history.

(56) References Cited

U.S. PATENT DOCUMENTS

| | | | |
|---|---|---|---|
| 2007/0122027 A1* | 5/2007 | Kunita | G06T 7/593 382/154 |
| 2012/0069004 A1* | 3/2012 | Takama | H04N 13/122 345/419 |
| 2012/0293640 A1* | 11/2012 | Hirai | G02B 27/0093 348/54 |
| 2015/0172641 A1* | 6/2015 | Nakamura | H04N 13/395 348/54 |

FOREIGN PATENT DOCUMENTS

| | | |
|---|---|---|
| JP | 2004-294848 A | 10/2004 |
| JP | 2006-221128 A | 8/2006 |
| JP | 2007288317 A * | 11/2007 |

* cited by examiner

*Primary Examiner* — Marnie A Matt
(74) *Attorney, Agent, or Firm* — Sughrue Mion, PLLC

(57) ABSTRACT

A three-dimensional-image display device includes a display unit that sequentially displays parallax images; a variable focus lens unit that respectively forms virtual images of each of the parallax images on display surfaces; and a control unit that distributes, in accordance with a position of a stereoscopic image, a luminance of the stereoscopic image to a luminance of the parallax images. In a case in which the position of the stereoscopic image is a first position positioned between a closest display surface and a farthest display surface, the control unit changes, in accordance with the distance between an observer and the stereoscopic image, a distribution ratio for distributing the luminance of the stereoscopic image to the luminance of the parallax images.

12 Claims, 16 Drawing Sheets

THREE-DIMENSIONAL-IMAGE DISPLAY DEVICE AND IMAGE GENERATION DEVICE

CROSS-REFERENCE TO RELATED APPLICATIONS

This application claims the benefit of Japanese Patent Application No. 2023-215168, filed on Dec. 20, 2023, the entire disclosure of which is incorporated by reference herein.

FIELD OF THE INVENTION

The present disclosure relates generally to a three-dimensional-image display device and image generation device.

BACKGROUND OF THE INVENTION

In the related art, depth fused 3D (DFD) three-dimensional-image display devices are known as display devices that display three-dimensional-images (stereoscopic images) viewable by the unaided eye. For example, Unexamined Japanese Patent Application Publication No. 2004-294848 describes a three-dimensional display device including a display device that displays a right eye parallax image and a left eye parallax image, a first bifocal lens provided in front of a right eye of an observer, a second bifocal lens provided in front of a left eye of the observer, and a synchronization device that switches between a focal distance of the first bifocal lens and a focal distance of the second bifocal lens.

The three-dimensional display device of Unexamined Japanese Patent Application Publication No. 2004-294848 displays the right eye parallax image and the left eye parallax image respectively on two virtual surfaces. The three-dimensional display device of Unexamined Japanese Patent Application Publication No. 2004-294848 displays a three-dimensional stereoscopic image between the two virtual surfaces by distributing, in accordance with a depth position of the three-dimensional stereoscopic image, a luminance ratio of the right eye parallax image and the left eye parallax image displayed on one of the virtual surfaces and the right eye parallax image and the left eye parallax image displayed on the other virtual surface. As a result, the three-dimensional display device of Unexamined Japanese Patent Application Publication No. 2004-294848 suppresses the conflicts among the physiological factors in stereoscopic viewing (binocular disparity, convergence, and accommodation), and reduces the eye strain and the like of the observer.

However, with the three-dimensional display device of Unexamined Japanese Patent Application Publication No. 2004-294848, the stereoscopic image is displayed between the two virtual surfaces and, consequently, the range in which the stereoscopic image can be displayed is narrow.

SUMMARY OF THE INVENTION

A three-dimensional-image display device according to a first aspect of the present disclosure includes:
a display unit that sequentially displays parallax images that are stereoscopically viewable;
a variable focus lens unit in which a focal distance for display light of each of the parallax images switches, and that forms a virtual image of each of the parallax images on each of a plurality of display surfaces positioned in a depth direction from a perspective of an observer; and
a control unit that distributes, in accordance with a position of a stereoscopic image formed from the virtual images of the parallax images, a luminance of the stereoscopic image to a luminance of the parallax images, wherein
the control unit distributes the luminance of the stereoscopic image to the luminance of at least one of the parallax images, and
in a case in which, among the plurality of display surfaces, the display surface for which a distance from the observer is closest is defined as a closest display surface and, among the plurality of display surfaces, the display surface for which the distance from the observer is farthest is defined as a farthest display surface,
the control unit
in a case in which the position of the stereoscopic image is a first position positioned between the closest display surface and the farthest display surface, changes, in accordance with the distance between the observer and the stereoscopic image, a distribution ratio for distributing the luminance of the stereoscopic image to the luminance of the parallax images, and
in a case in which the position of the stereoscopic image is a second position at which the distance from the observer is less than or equal to the distance between the observer and the closest display surface, or is a third position at which the distance from the observer is greater than or equal to the distance between the observer and the farthest display surface, sets the distribution ratio to constant.

A three-dimensional-image display device according to a second aspect of the present disclosure includes:
a display unit that sequentially displays two parallax images that are stereoscopically viewable;
a variable focus lens unit in which a focal distance for display light of the two parallax images switches, and that forms a virtual image of each of the parallax images on each of two display surfaces positioned in a depth direction from a perspective of an observer; and
a control unit that distributes, in accordance with a position of a stereoscopic image formed from the virtual images of the parallax images, a luminance of the stereoscopic image to a luminance of the parallax images, wherein
the control unit distributes the luminance of the stereoscopic image to the luminance of at least one of the parallax images, and
in a case in which, among the two display surfaces, the display surface for which a distance from the observer is closest is defined as a closest display surface and, among the two display surfaces, the display surface for which the distance from the observer is farthest is defined as a farthest display surface,
the control unit
in a case in which the position of the stereoscopic image is a first position positioned between the closest display surface and the farthest display surface, changes, in accordance with the distance between the observer and the stereoscopic image, a distribution ratio for distributing the luminance of the stereoscopic image to the luminance of the parallax images, and in a case in which the position of the stereoscopic image is a second position at which the distance from the observer is less than or equal to the distance between the observer and the closest display surface, or is a third position at which the distance from the observer is greater than or equal to the distance between the observer and the farthest display surface, sets the distribution ratio to constant.

An image generation device according to a third aspect of the present disclosure includes:

a luminance calculator that calculates a distribution ratio for distributing, based on a position of a stereoscopic image of a display subject and a position of each of a plurality of display surfaces on which each virtual image of parallax images forming the stereoscopic image is displayed, a luminance of the stereoscopic image to a luminance of the parallax images; and a parallax image generator that generates, based on the distribution ratio calculated by the luminance calculator, parallax image data expressing the parallax images, wherein in a case in which, among the plurality of display surfaces, the display surface for which a distance from an observer is closest is defined as a closest display surface and, among the plurality of display surfaces, the display surface for which the distance from the observer is farthest is defined as a farthest display surface, the luminance calculator in a case in which the position of the stereoscopic image is a first position positioned between the closest display surface and the farthest display surface, changes, in accordance with the distance between the observer and the stereoscopic image, the distribution ratio for distributing the luminance of the stereoscopic image to the luminance of the parallax images, and in a case in which the position of the stereoscopic image is a second position at which the distance from the observer is less than or equal to the distance between the observer and the closest display surface, or is a third position at which the distance from the observer is greater than or equal to the distance between the observer and the farthest display surface, sets the distribution ratio to constant.

It is to be understood that both the foregoing general description and the following detailed description are exemplary and explanatory and are not restrictive of this disclosure.

BRIEF DESCRIPTION OF DRAWINGS

A more complete understanding of this application can be obtained when the following detailed description is considered in conjunction with the following drawings, in which.

DETAILED DESCRIPTION OF THE INVENTION

Hereinafter, a three-dimensional-image display device according to various embodiments is described while referencing the drawings.

Embodiment 1

A three-dimensional-image display device 10 according to the present embodiment is described while referencing FIGS. 1 to 14. In one example, the three-dimensional-image display device 10 is used as a head-mounted display.

Overall Configuration

Figure 1:
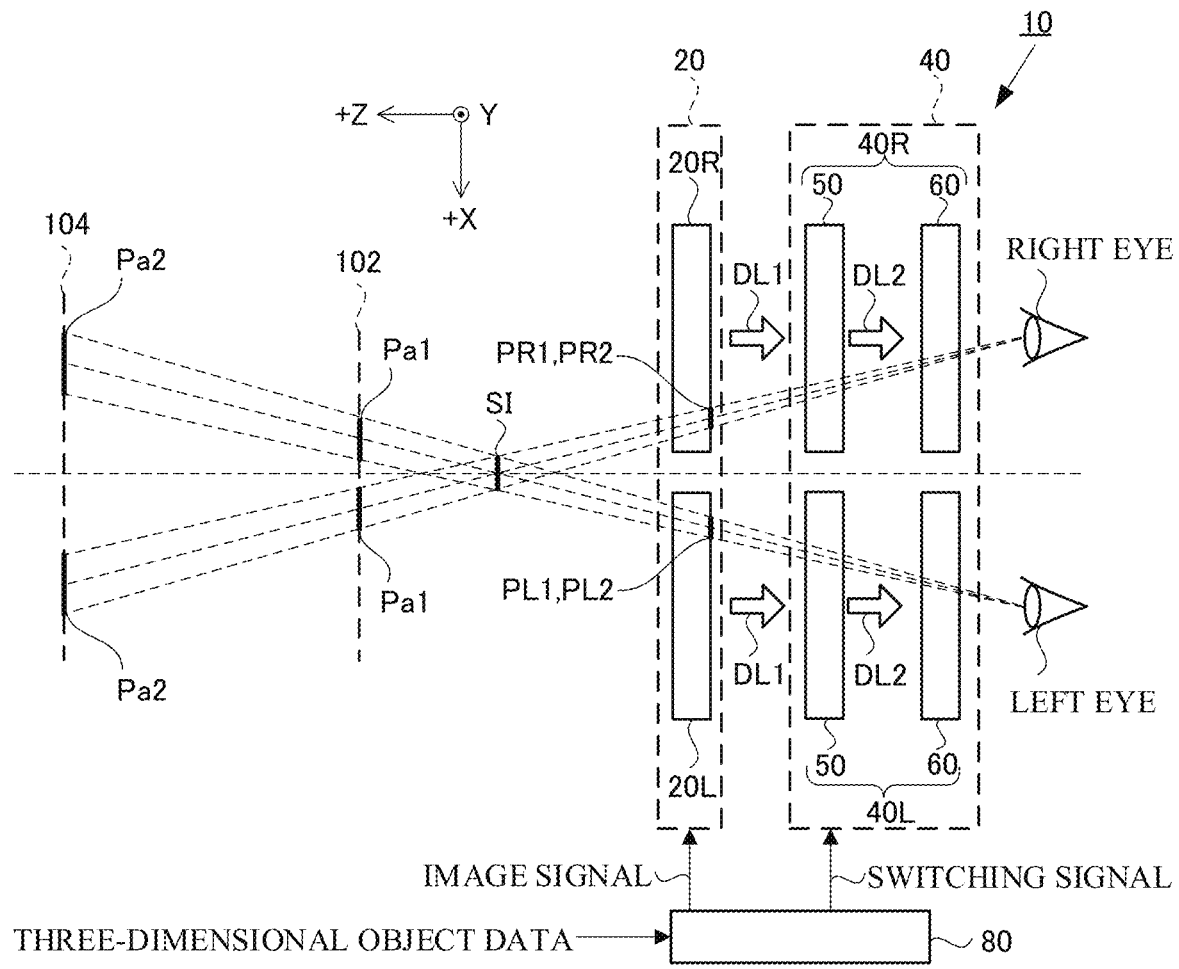
FIG. 1 is a schematic drawing illustrating a three-dimensional-image display device according to Embodiment 1.

Firstly, the overall configuration of the three-dimensional-image display device 10 is described. As illustrated in FIG. 1, the three-dimensional-image display device 10 includes a display unit 20, a variable focus lens unit 40, and a control unit 80.

The display unit 20 sequentially displays a stereoscopically viewable first parallax image and a stereoscopically viewable second parallax image in time divisions. In the present embodiment, the display unit 20 emits display light DL1 of the first parallax image and the second parallax image as polarized light for which the polarization direction is a predetermined first direction. The display unit 20 includes a right eye display device 20R and a left eye display device 20L.

The variable focus lens unit 40 switches between a focal distance for the display light DL1 of the first parallax image and a focal distance for the display light DL1 of the second parallax image to respectively form, as virtual images, the first parallax image and the second parallax image on a first display surface 102 and a second display surface 104 positioned in the depth direction from the perspective of an observer. A virtual image Pa1 of the first parallax image and a virtual image Pa2 of the second parallax image form a stereoscopic image SI of the display subject (for example, a three-dimensional object). In the present embodiment, the variable focus lens unit 40 includes a right eye lens unit 40R and a left eye lens unit 40L. The right eye lens unit 40R corresponds to the right eye display device 20R, and the left eye lens unit 40L corresponds to the left eye display device 20L. The first display surface 102 and the second display surface 104 are described later.

The control unit 80 controls, in accordance with the position of the stereoscopic image SI, the luminance of the first parallax image (the virtual image Pa1 of the first parallax image) and the second parallax image (the virtual image Pa2 of the second parallax image). The control unit 80 generates first parallax image data expressing the first parallax image and second parallax image data expressing the second parallax image. In the present specification, the control unit 80 functions as an image generation device. Additionally, the control unit 80 controls the display unit 20 and the variable focus lens unit 40.

In the present description, to facilitate comprehension, in the three-dimensional-image display device 10 of FIG. 1, the left direction (the left direction on paper) is referred to as the "+Z direction", the down direction (the down direction on paper) is referred to as the "+X direction", and the direction perpendicular to the +X direction and the +Z direction (the front direction on paper) is referred to as the "+Y direction."

Display Unit

The display unit 20 of the three-dimensional-image display device 10 sequentially displays, in time divisions, the first parallax image and the second parallax image on the basis of an image signal supplied from the control unit 80. In the present embodiment, the display unit 20 emits the display light DL1 of the first parallax image and the second parallax image as polarized light for which the polarization direction is a predetermined first direction. The display light DL1 of the first parallax image and the second parallax image enters the variable focus lens unit 40. Here, the predetermined first direction is the X direction.

The display unit 20 includes the right eye display device 20R positioned in front of the right eye (the +Z side) of the observer, and the left eye display device 20L positioned in front of the left eye (the +Z side) of the observer. The right eye display device 20R displays a right eye image, and the left eye display device 20L displays a left eye image. Display light of the right eye image enters the right eye of the observer. Display light of the left eye image enters the left eye of the observer. One right eye image and one left eye image form one parallax image.

In the present embodiment, a first right eye image PR1 displayed on the right eye display device 20R and a first left eye image PL1 displayed on the left eye display device 20L form the first parallax image. Additionally, a second right eye image PR2 displayed on the right eye display device 20R and a second left eye image PL2 displayed on the left eye display device 20L form the second parallax image. That is, the right eye display device 20R and the left eye display device 20L are synchronized to simultaneously display the first right eye image PR1 and the first left eye image PL1, and simultaneously display the second right eye image PR2 and the second left eye image PL2.

The display light DL1 of the first right eye image PR1 and the second right eye image PR2 enters the right eye lens unit 40R of the variable focus lens unit 40. The display light DL1 of the first left eye image PL1 and the second left eye image PL2 enters the left eye lens unit 40L of the variable focus lens unit 40.

Figure 2:
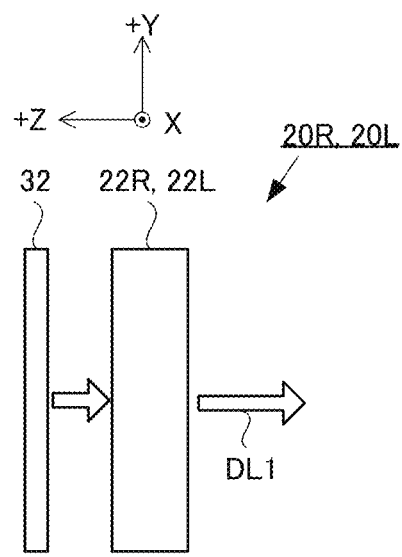
FIG. 2 is a schematic drawing illustrating a display unit according to Embodiment 1.

As illustrated in FIG. 2, the right eye display device 20R includes a right eye liquid crystal display panel 22R and a light source 32. The left eye display device 20L includes a left eye liquid crystal display panel 22L and the light source 32. The configuration of the right eye display device 20R and the configuration of the left eye display device 20L are the same and, as such, the right eye display device 20R is described as an example of the right eye display device 20R and left eye display device 20L.

The right eye liquid crystal display panel 22R modulates light emitted from the light source 32, thereby sequentially displaying the first right eye image PR1 and the second right eye image PR2 in time divisions. In one example, the right eye liquid crystal display panel 22R is implemented as a transmissive twisted nematic (TN) liquid crystal display that is active matrix driven by a thin film transistor (TFT).

Figure 3:
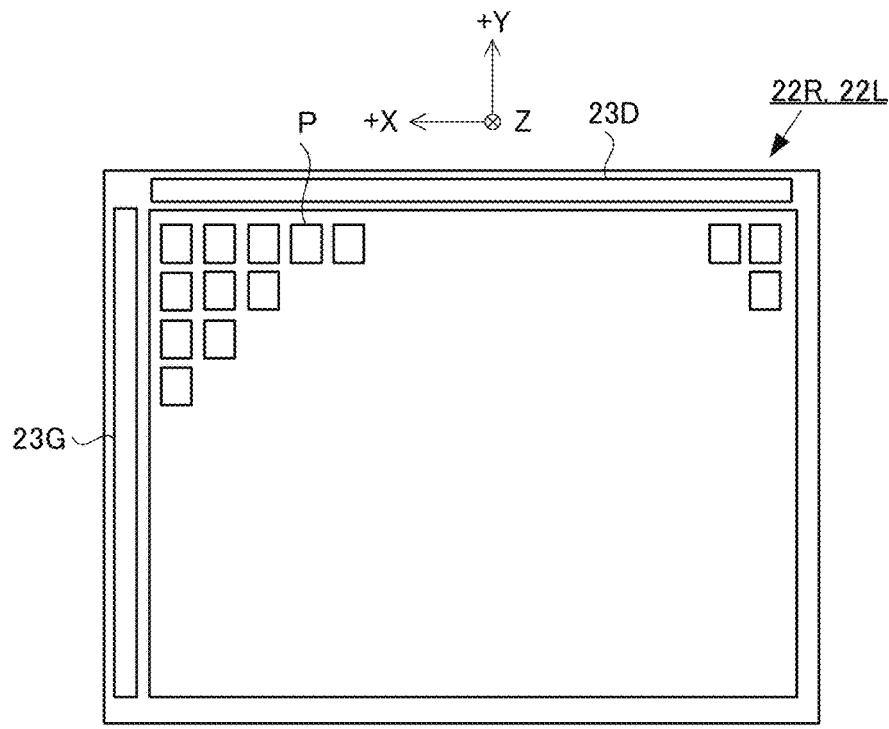
FIG. 3 is a plan view illustrating a right eye liquid crystal display panel and a left eye liquid crystal display panel according to Embodiment 1.

As illustrated in FIG. 3, the right eye liquid crystal display panel 22R includes pixels P arranged in a matrix, a gate driver 23G, and a data driver 23D. The gate driver 23G sequentially selects the pixels P by row, and performs line progressive scanning in the −Y direction. The data driver 23D supplies, to each of the selected pixels P, a voltage corresponding to an image signal, thereby writing the image signal to each of the pixels P. The image signal is a signal for displaying the first right eye image PR1 or the second right eye image PR2. Additionally, the right eye liquid crystal display panel 22R includes a polarizing plate, a liquid crystal, and the like.

Note that FIG. 3 illustrates only a portion of the pixels P arranged in the matrix. The left eye liquid crystal display panel 22L of the left eye display device 20L modulates light emitted from the light source 32, thereby sequentially displaying the first left eye image PL1 and the second left eye image PL2 in time divisions.

In one example, the light source 32 is implemented as a direct back light that is provided on a back surface (the +Z side) of each of the right eye liquid crystal display panel 22R and the left eye liquid crystal display panel 22L. The light source (back light) 32 includes a light emitting diode (LED), a reflection sheet, a diffusion sheet, and the like, which are not illustrated.

Variable Focus Lens Unit

As illustrated in FIG. 1, the variable focus lens unit 40 of the three-dimensional-image display device 10 includes the right eye lens unit 40R and the left eye lens unit 40L. The right eye lens unit 40R is disposed between the right eye display device 20R and the right eye of the observer. The left eye lens unit 40L is disposed between the left eye display device 20L and the left eye of the observer.

The right eye lens unit 40R switches, synchronous with the displaying of the right eye liquid crystal display panel 22R, the focal distance for the display light DL1 of the first right eye image PR1 and the focal distance for the display light DL1 of the second right eye image PR2, and respectively forms each of the first right eye image PR1 and the second right eye image PR2 as a virtual image on the first display surface 102 and the second display surface 104. The left eye lens unit 40L switches, synchronous with the displaying of the left eye liquid crystal display panel 22L, the focal distance for the display light DL1 of the first left eye image PL1 and the focal distance for the display light DL1 of the second left eye image PL2, and respectively forms each of the first left eye image PL1 and the second left eye image PL2 as a virtual image on the first display surface 102 and the second display surface 104. As a result, the virtual image Pa1 of the first parallax image is formed on the first display surface 102, and the virtual image Pa2 of the second parallax image is formed on the second display surface 104.

Each of the right eye lens unit 40R and the left eye lens unit 40L includes a polarization switcher 50 and a polarized bifocal lens 60. The polarization switcher 50 projects while switching the polarization direction of the display light DL1 emitted from the display unit 20 between the predetermined first direction and a predetermined second direction. The polarized bifocal lens 60 is a lens for which the focal distance, for the projected light projected from the polarization switcher 50, differs depending on the polarization direction of the projected light.

The polarization switcher 50 of the right eye lens unit 40R switches, on the basis of a switching signal that is supplied from the control unit 80, the polarization direction of the display light DL1 emitted from the right eye display device 20R between the predetermined first direction (the X direction) and the predetermined second direction. The switching signal is synchronized with the image signal supplied to the display unit 20 (the right eye liquid crystal display panel 22R). In the present embodiment, the predetermined second direction is the Y direction.

Specifically, in a case in which the first right eye image PR1 is being displayed on the right eye liquid crystal display panel 22R, the polarization switcher 50 maintains, in the X direction, the polarization direction of the display light DL1 that enters from the right eye liquid crystal display panel 22R, and projects. Meanwhile, in a case in which the second right eye image PR2 is being displayed on the right eye liquid crystal display panel 22R, the polarization switcher 50 switches, to the Y direction, the polarization direction of the display light DL1 that enters from the right eye liquid crystal display panel 22R, and projects.

Figure 4:
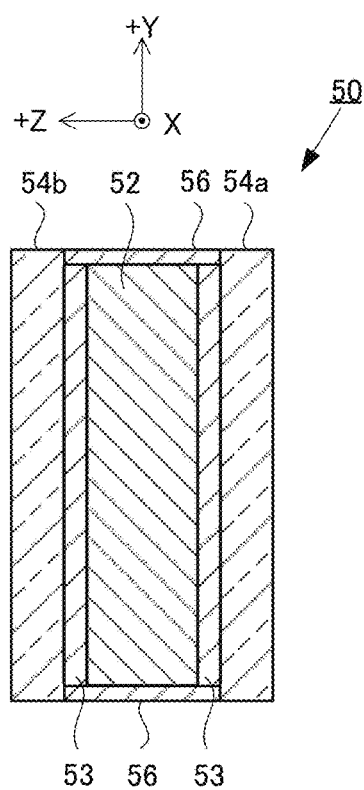
FIG. 4 is a cross-sectional view illustrating a polarization switcher according to Embodiment 1.

In one example, the polarization switcher 50 is implemented as a TN liquid crystal element that has a twist angle of 90°. As illustrated in FIG. 4, the polarization switcher (the TN liquid crystal element) 50 includes a liquid crystal 52, two light-transmitting substrates 54a and 54b that include an electrode 53 that applies voltage to the liquid crystal 52, and an alignment film (not illustrated) that aligns the liquid crystal 52. Here, the two light-transmitting substrates 54a and 54b sandwich the liquid crystal 52. The light-transmitting substrate 54a and the light-transmitting substrate 54b are adhered to each other by a sealing material 56. When an OFF level switching signal is supplied, the polarization switcher 50 rotates the polarization direction of the display light DL1 90°, and projects a display light DL2. The polarization direction of the display light DL2 is the Y direction. When an ON level switching signal is supplied to the polarization switcher 50, the liquid crystal 52 is aligned perpendicularly to the light-transmitting substrates 54a and 54b, and the polarization switcher 50 projects the display light DL2 while maintaining the polarization direction of the display light DL1 in the X direction. The display light DL2 projected from the polarization switcher 50 enters the polarized bifocal lens 60.

The polarized bifocal lens 60 of the right eye lens unit 40R is a lens for which the focal distance for the projected light from the polarization switcher 50, that is, for the display light DL2 emitted from the polarization switcher 50, differs depending on the polarization direction (the X direction and the Y direction) of the display light DL2. The polarized bifocal lens 60 respectively forms the first right eye image PR1 and the second right eye image PR2 as a virtual image from the perspective of the observer on the first display surface 102 and the second display surface 104. The first display surface 102 and the second display surface 104 are imaginary display surfaces positioned at different positions in the depth direction (the +Z direction) from the perspective of the observer. In the present embodiment, as illustrated in FIG. 1, from the perspective of the observer, the first display surface 102 and the second display surface 104 are positioned farther away than the display unit 20. Additionally, the first display surface 102 is positioned more to the observer side (the −Z side) than the second display surface 104. The first display surface 102 of the present embodiment corresponds to a closest display surface, and the second display surface 104 of the present embodiment corresponds to a farthest display surface.

Figure 5:
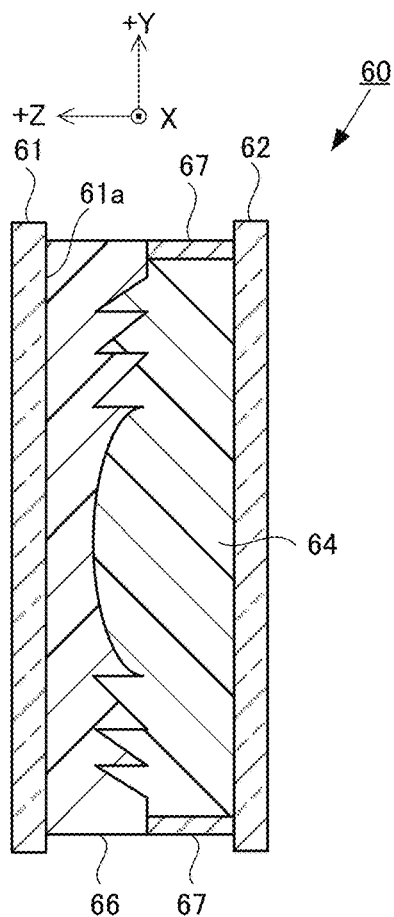
FIG. 5 is a cross-sectional view illustrating a polarized bifocal lens according to Embodiment 1.

In one example, the polarized bifocal lens 60 is implemented as a liquid crystal lens. As illustrated in FIG. 5, the polarized bifocal lens (the liquid crystal lens) 60 includes a first light-transmitting substrate 61, a second light-transmitting substrate 62, and a liquid crystal 64.

In one example, the first light-transmitting substrate 61 and the second light-transmitting substrate 62 are implemented as glass substrates. The first light-transmitting substrate 61 includes a resin fresnel lens 66 on a first main surface 61*a* that faces the second light-transmitting substrate 62. The first light-transmitting substrate 61 and the second light-transmitting substrate 62 are adhered to each other by a seal material 67, and sandwich the liquid crystal 64. In one example, the liquid crystal 64 is implemented as a nematic liquid crystal that has positive refractive index anisotropy (Δn=ne−no>0, where ne is the refractive index of the extraordinary ray, and no is the refractive index of the ordinary ray). The liquid crystal 64 is aligned in the Y direction by a non-illustrated alignment film.

When the display light DL2 of the first right eye image PR1, which has the X direction as the polarization direction, enters the polarized bifocal lens 60, the nematic liquid crystal that has positive refractive index anisotropy is aligned with the Y direction and, as such, the focal distance of the polarized bifocal lens 60 for the display light DL2 is long, and a virtual image of the first right eye image PR1 is formed on the first display surface 102. Meanwhile, when the display light DL2 of the second right eye image PR2, which has the Y direction as the polarization direction, enters the polarized bifocal lens 60, the focal distance of the polarized bifocal lens 60 for the display light DL2 is short, and a virtual image of the second right eye image PR2 is formed on the second display surface 104.

The configurations of the polarization switcher 50 and the polarized bifocal lens 60 of the left eye lens unit 40L are the same as the configurations of the polarization switcher 50 and the polarized bifocal lens 60 of the right eye lens unit 40R. The polarization switcher 50 of the left eye lens unit 40L switches the polarization direction of the display light DL1 emitted from the left eye display device 20L between the predetermined first direction and the predetermined second direction. The polarized bifocal lens 60 of the left eye lens unit 40L respectively forms the first left eye image PL1 and the second left eye image PL2 as a virtual image from the perspective of the observer on the first display surface 102 and the second display surface 104.

The observer views the virtual image Pa1 of the first parallax image and the virtual image Pa2 of the second parallax image that are displayed sequentially in time divisions, and recognizes the stereoscopic image SI of the display subject. The luminance of the first parallax image (the virtual image Pa1 of the first parallax image) and the second parallax image (the virtual image Pa2 of the second parallax image) are controlled in accordance with the position of the stereoscopic image SI. The position of the stereoscopic image SI, and the luminance of the first parallax image and the second parallax image are described later.

Control Unit

The control unit 80 of the three-dimensional-image display device 10 generates, on the basis of three-dimensional object data inputted from a non-illustrated external device and expressing the display subject, the first parallax image data expressing the first parallax image and the second parallax image data expressing the second parallax image. In the generation of the first parallax image data and the second parallax image data, the control unit 80 distributes, in accordance with the position of the stereoscopic image SI, the luminance of the stereoscopic image SI to the luminance of the first parallax image and the luminance of the second parallax image. Additionally, the control unit 80 controls the display unit 20 and the variable focus lens unit 40.

Figure 6:
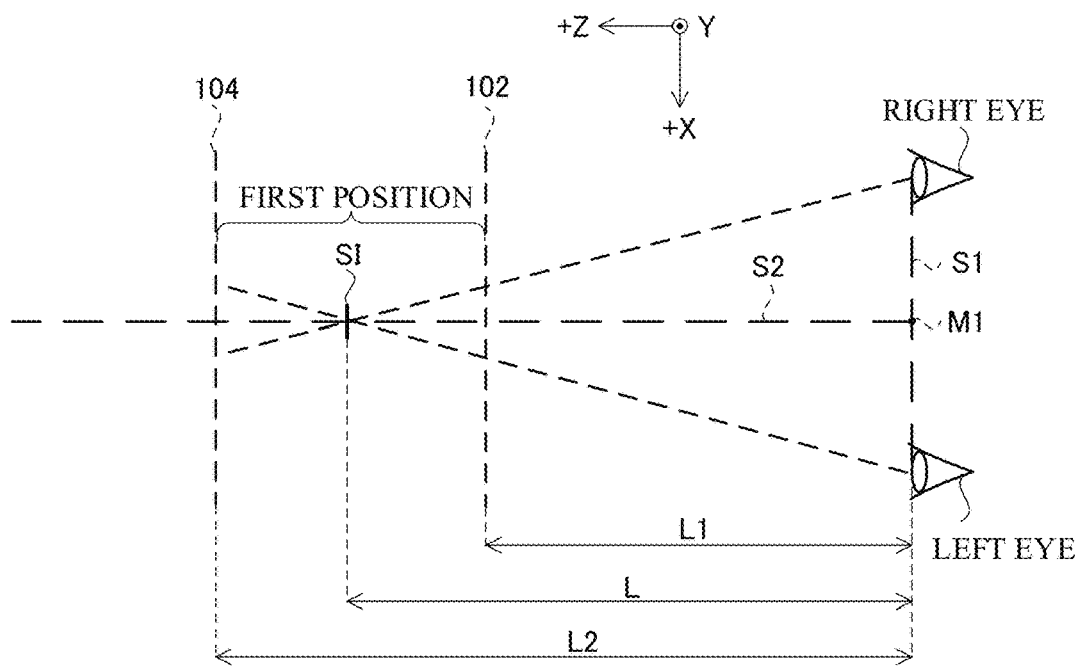
FIG. 6 is a schematic drawing illustrating a stereoscopic image displayed at a first position according to Embodiment 1.
Figure 7:
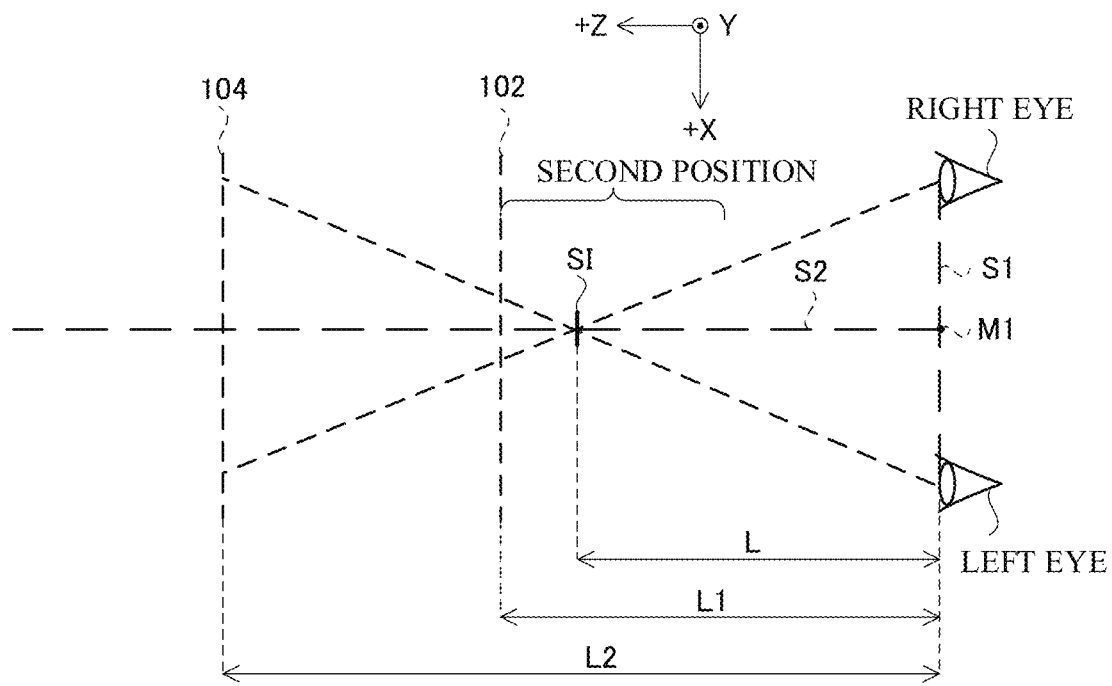
FIG. 7 is a schematic drawing illustrating the stereoscopic image displayed at a second position according to Embodiment 1.
Figure 8:
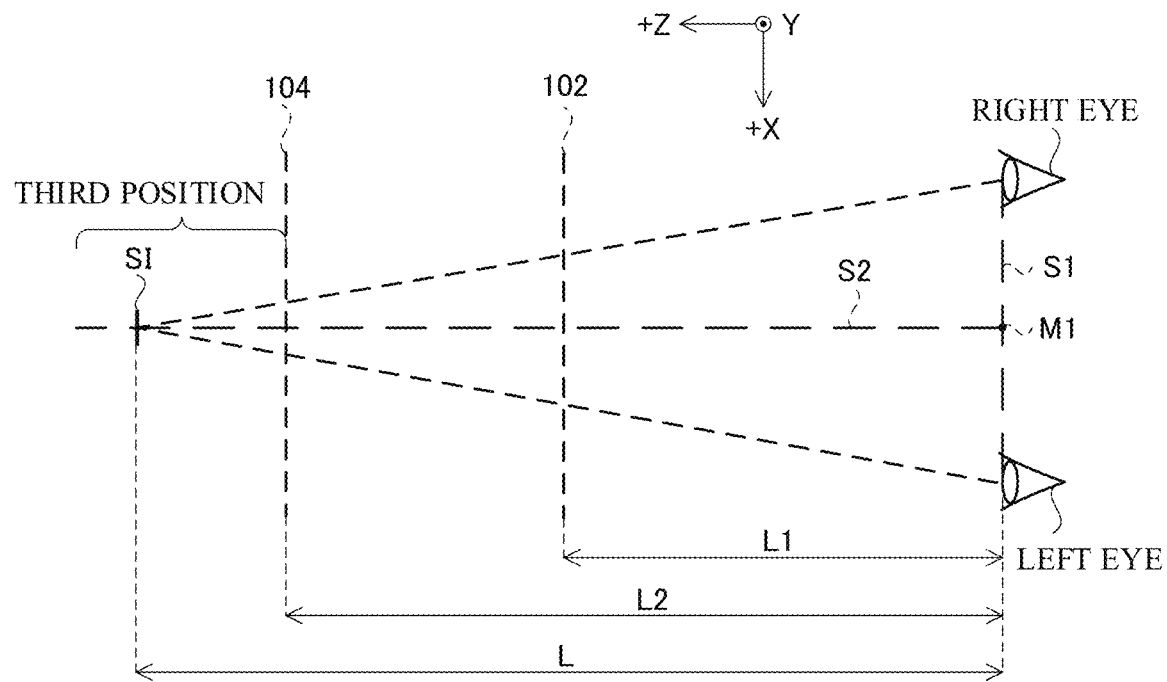
FIG. 8 is a schematic drawing illustrating the stereoscopic image displayed at a third position according to Embodiment 1.

Firstly, the relationship between the position of the stereoscopic image SI and the luminance of the first parallax image and the second parallax image is described. In the present embodiment, as illustrated in FIGS. 6 to 8, the position of the stereoscopic image SI is described for a case in which the stereoscopic image SI is formed on a straight line S2 that extends, from the perspective of the observer, in the depth direction (the +Z direction) from a midpoint M1 of a straight line S1 that connects a perspective of the right eye and a perspective of the left eye. Here, the position of the midpoint M1 is the position of the observer, and a distance between the observer and the stereoscopic image SI is defined as L. A distance between the observer and a crossing point of the straight line S2 with the first display surface 102 (hereinafter referred to as "distance between the observer and the first display surface 102") is defined as L1. A distance between the observer and a crossing point of the straight line S2 with the second display surface 104 (hereinafter referred to as "distance between the observer and the second display surface 104") is defined as L2. Furthermore, on the straight line S2, a position between the first display surface 102 (the closest display surface) and the second display surface 104 (the farthest display surface) is defined as a first position, a position at which the distance from the observer is less than or equal to the distance L1 between the observer and the first display surface 102 (the closest display surface) is defined as a second position, and a position at which the distance from the observer is greater than or equal to the distance L2 between the observer and the second display surface 104 (the farthest display surface) is defined as a third position.

Figure 9:
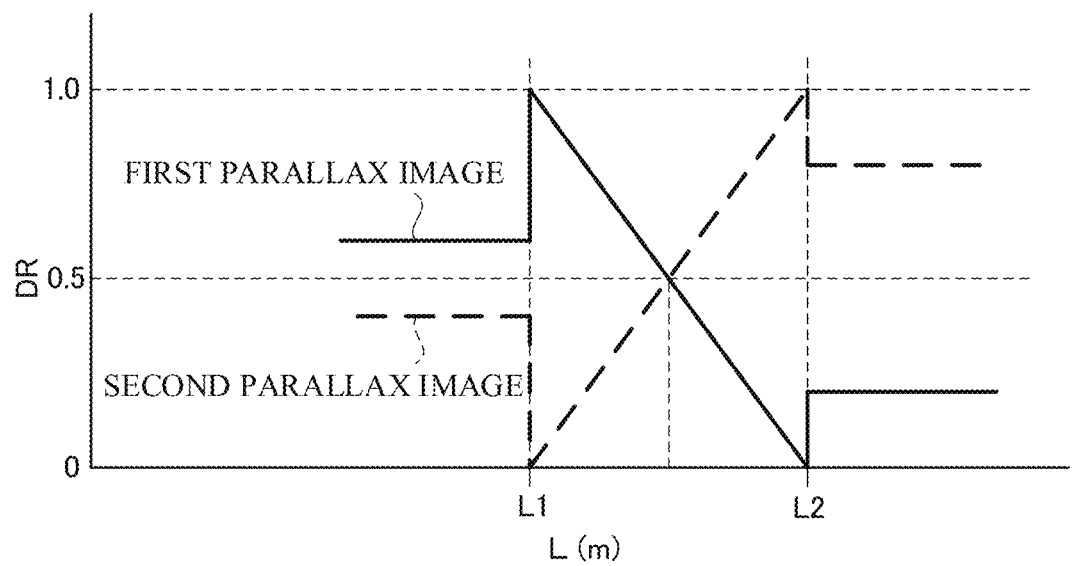
FIG. 9 is a schematic drawing illustrating a distribution ratio to a luminance of a first parallax image and to a luminance of a second parallax image according to Embodiment 1.

In a case in which the stereoscopic image SI is formed at the first position (L1<L<L2) as illustrated in FIG. 6, the control unit 80, in a manner similar to a DFD-type three-dimensional-image display device, changes, in accordance with the distance L between the observer and the stereoscopic image SI (that is, the position of the stereoscopic image), the distribution ratio DR for distributing the luminance of the stereoscopic image SI to the luminance of the first parallax image and the luminance of the second parallax image, as illustrated in FIG. 9. For example, in a case in which the luminance of the stereoscopic image SI is 1, and the stereoscopic image SI is formed between the first display surface 102 and the second display surface 104, the control unit 80 sets the distribution ratio DR to the luminance of the first parallax image and the luminance of the second parallax image to 0.5:0.5. As the position at which the stereoscopic image SI is formed approaches the first display surface 102 from between the first display surface 102 and the second display surface 104, the control unit 80 increases the proportion distributed to the luminance of the first parallax image. As the position of the stereoscopic image SI approaches the second display surface 104 from between the first display surface 102 and the second display surface 104, the control unit 80 increases the proportion distributed to the luminance of the second parallax image.

In a case in which the luminance of the stereoscopic image SI is SIL, the luminance of the first parallax image is LP1, and the luminance of the second parallax image is LP2, in one example, the luminance LP1 of the first parallax image is expressed by Equation (1) below, and the luminance LP2 of the second parallax image is expressed by Equation (2) below.

$$LP1 = SIL \times \frac{L2 - L}{L2 - L1} \quad (1)$$

$$LP2 = SIL \times \frac{L - L1}{L2 - L1} \qquad (2)$$

When the stereoscopic image SI is positioned at the first position, the virtual image Pa1 of the first parallax image and the virtual image Pa2 of the second parallax image are, respectively, sequentially displayed on the first display surface 102 and the second display surface 104, and the luminance of the stereoscopic image SI is distributed, in accordance with the distance L between the observer and the stereoscopic image SI, to the luminance of the first parallax image and the luminance of the second parallax image. As such, the observer perceives that the focal point of the eyes is located at the position of the stereoscopic image SI.

Additionally, the observer perceives that the distance from the stereoscopic image SI due to parallax and convergence coincides with the distance from the stereoscopic image SI due to the focus of the eyes. Accordingly, the three-dimensional-image display device 10 can suppress the conflicts among the physiological factors in stereoscopic viewing, and display the stereoscopic image SI.

As illustrated in FIG. 7, in a case in which the stereoscopic image SI is formed at the second position (L≤L1), as illustrated in FIG. 9, the control unit 80 distributes the luminance of the stereoscopic image SI to the luminance of the first parallax image and the luminance of the second parallax image, and sets the distribution ratio DR to constant, regardless of the distance L between the observer and the stereoscopic image SI. The luminance of the stereoscopic image SI is distributed to the luminance of the first parallax image and the luminance of the second parallax image with the distribution ratio DR set to constant, and the three-dimensional-image display device 10 can display the stereoscopic image SI at the correct luminance due to binocular disparity.

In a case in which the stereoscopic image SI is formed at the second position, it is preferable that the control unit 80 sets the proportion distributed to the luminance of the first parallax image, the virtual image of which is displayed on the first display surface 102, for which the distance from the observer is close, to greater than or equal to the proportion distributed to the luminance of the second parallax image. Due to this configuration, the three-dimensional-image display device 10 can match the position of the stereoscopic image SI due to parallax to the position of the stereoscopic image SI due to the luminance ratio of the first parallax image and the second parallax image.

As illustrated in FIG. 8, in a case in which the stereoscopic image SI is formed at the third position (L≥L2), as illustrated in FIG. 9, the control unit 80 distributes the luminance of the stereoscopic image SI to the luminance of the first parallax image and the luminance of the second parallax image, and sets the distribution ratio DR to constant, regardless of the distance L between the observer and the stereoscopic image SI. By setting the distribution ratio DR to constant, the three-dimensional-image display device 10 can display the stereoscopic image SI at the correct luminance.

In a case in which the stereoscopic image SI is formed at the third position, it is preferable that the control unit 80 sets the proportion distributed to the luminance of the second parallax image, the virtual image of which is displayed on the second display surface 104, for which the distance from the observer is great, to greater than or equal to the proportion distributed to the luminance of the first parallax image. Due to this configuration, the three-dimensional-image display device 10 can match the position of the stereoscopic image SI due to parallax to the position of the stereoscopic image SI due to the luminance ratio of the first parallax image and the second parallax image.

In a case in which the stereoscopic image SI is positioned at the second position, it is preferable that the distance L between the observer and the stereoscopic image SI and the distance L1 between the observer and the first display surface 102 satisfy Equation (3) below. Additionally, in a case in which the stereoscopic image SI is positioned at the third position, it is preferable that the distance L between the observer and the stereoscopic image SI and the distance L2 between the observer and the second display surface 104 satisfy Equation (4) below. Due to these configurations, the three-dimensional-image display device 10 can suppress the conflicts among the physiological factors in stereoscopic viewing, and display the stereoscopic image SI. Reasons for these are given below.

$$\frac{1}{L} - \frac{1}{L1} < 0.3 \qquad (3)$$

$$\frac{1}{L2} - \frac{1}{L} < 0.3 \qquad (4)$$

Figure 10:
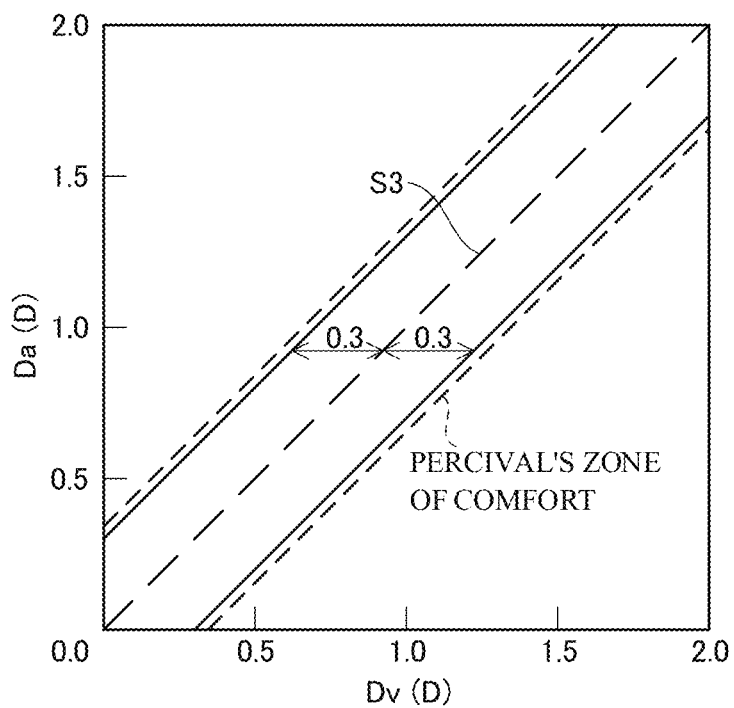
FIG. 10 is a drawing illustrating the relationship between a distance perceived by accommodation and a distance perceived by convergence.

Typically, the relationship between a distance Da perceived by accommodation of the eyes and a distance Dv perceived by convergence is expressed as in FIG. 10. In FIG. 10, on a straight line S3 that passes through the origin and has a slope of 1, the distance Da perceived by accommodation and the distance Dv perceived by convergence match each other. The degree of discomfort of the observer increases as the distance from the straight line S3 increases. Note that the unit D is the reciprocal of a meter (1/m).

In the relationship between the distance Da perceived by accommodation and the distance Dv perceived by convergence, there is a region call Percival's zone of comfort in which the degree of discomfort of the observer is low (for example, see Journal of Vision, 2008, 8, 1-30). Based on Percival's zone of comfort, when the difference between the distance Da perceived by accommodation and the distance Dv perceived by convergence is within 0.3D, the degree of discomfort realized by the observer is low and the conflicts among the physiological factors in stereoscopic viewing can be suppressed.

Accordingly, in a case in which the stereoscopic image SI is positioned at the second position, it is preferable that the difference between the reciprocal of the distance L between the observer and the stereoscopic image SI and the reciprocal of the distance L1 between the observer and the first display surface 102 is less than 0.3 (Equation (3)). Additionally, in a case in which the stereoscopic image SI is positioned at the third position, it is preferable that the difference between the reciprocal of the distance L2 between the observer and the second display surface 104 and the reciprocal of the distance L between the observer and the stereoscopic image SI is less than 0.3 (Equation (4)). Furthermore, regarding the distance L1 between the observer and the first display surface 102 and the distance L2 between the observer and the second display surface 104, Equation (5) can be obtained from Equations (3) and (4).

$$\frac{1}{L1} - \frac{1}{L2} < 0.6 \qquad (5)$$

Thus, not only in cases in which the stereoscopic image SI is positioned at the first position between the first display surface 102 and the second display surface 104, but also in cases in which the stereoscopic image SI is positioned at a distance less than or equal to the distance L1 between the observer and the first display surface 102 (cases in which the stereoscopic image SI is positioned at the second position), and also in cases in which the stereoscopic image SI is positioned at a distance greater than or equal to the distance L2 between the observer and the second display surface 104 (cases in which the stereoscopic image SI is positioned at the third position), the three-dimensional-image display device 10 can suppress the conflicts among the physiological factors in stereoscopic viewing and display the stereoscopic image SI.

Figure 11:
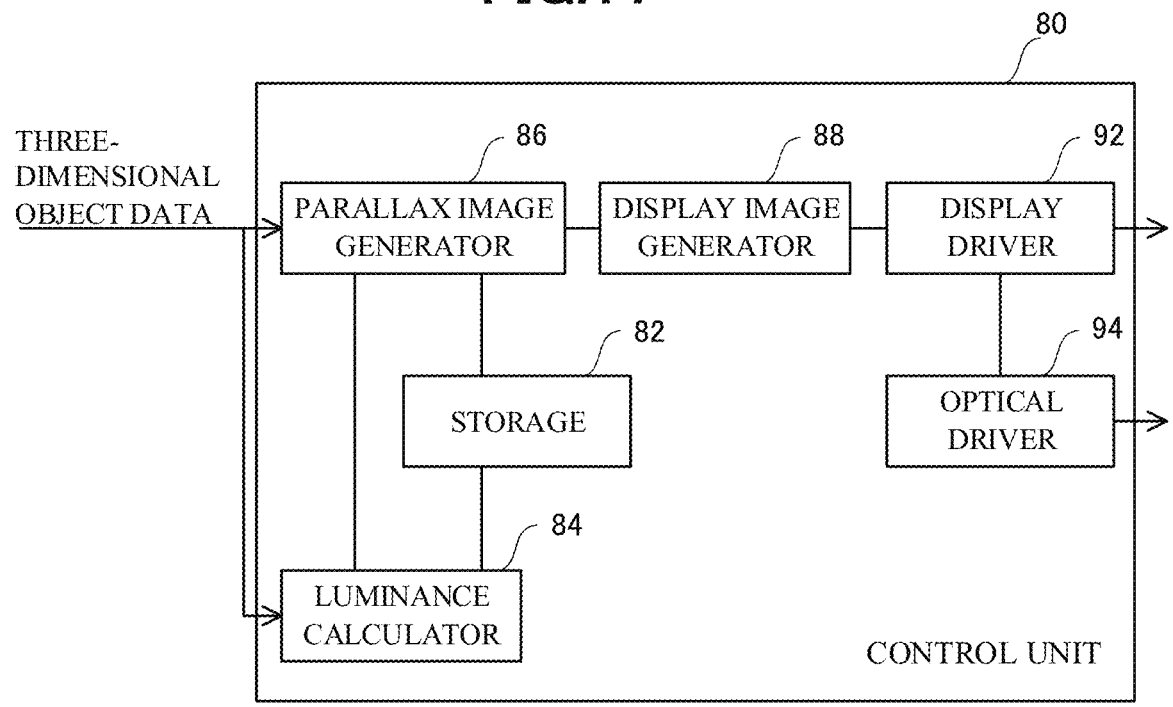
FIG. 11 is a block diagram illustrating a control unit according to Embodiment 1.

Next, the configurations of the various components of the control unit 80 are described. As illustrated in FIG. 11, the control unit 80 includes a storage 82, a luminance calculator 84, a parallax image generator 86, a display image generator 88, a display driver 92, and an optical driver 94.

The storage 82 of the control unit 80 stores programs that cause the luminance calculator 84, the parallax image generator 86, the display image generator 88, the display driver 92, and the optical driver 94 to function. Additionally, the storage 82 stores various types of data such as display surface data, perspective data, the distance L1 between the observer and the first display surface 102, the distance L2 between the observer and the second display surface 104, and the like. The display surface data is coordinate data expressing the positions of the first display surface 102 and the second display surface 104 in display space (three-dimensional space) in which the stereoscopic image SI is displayed. The perspective data is coordinate data expressing the position of the perspective of the observer in the display space.

The luminance calculator 84 of the control unit 80 calculates, on the basis of the position of the stereoscopic image SI and the positions of the first display surface 102 and the second display surface 104, the distribution ratio DR for distributing the luminance of the stereoscopic image SI to the luminance of the first parallax image and the luminance of the second parallax image. Specifically, the luminance calculator 84 calculates, on the basis of the three-dimensional object data expressing the display subject, the display surface data, and the perspective data, the distribution ratio DR for distributing the luminance of the stereoscopic image SI to the luminance of the first parallax image and the luminance of the second parallax image. The luminance calculator 84 outputs the calculated distribution ratio DR to the parallax image generator 86. The three-dimensional object data includes coordinate data expressing the position of the display subject in the display space, color data expressing a color of the display subject, and luminance data expressing the luminance of the display subject.

The luminance calculator 84 firstly calculates the distance L between the observer and the stereoscopic image SI from the coordinate data of the display subject, the display surface data, and the perspective data. In a case in which L1<L<L2, the luminance calculator 84 determines that the stereoscopic image SI is positioned at the first position and calculates the distribution ratio DR in accordance with the distance L between the observer and the stereoscopic image SI. For example, in a case in which the stereoscopic image SI is formed between the first display surface 102 and the second display surface 104, the luminance calculator 84 sets the distribution ratio DR for distributing the luminance of the stereoscopic image SI to the luminance of the first parallax image and the luminance of the second parallax image to 0.5:0.5. In a case in which L≤L1, the luminance calculator 84 determines that the stereoscopic image SI is positioned at the second position and sets the distribution ratio DR to constant, regardless of the distance L between the observer and the stereoscopic image SI. For example, the luminance calculator 84 sets the distribution ratio DR to 0.6:0.4. Furthermore, in a case in which L2≤L, the luminance calculator 84 determines that the stereoscopic image SI is positioned at the third position and sets the distribution ratio DR to constant, regardless of the distance L between the observer and the stereoscopic image SI. For example, the luminance calculator 84 sets the distribution ratio DR to 0.3:0.7. In cases in which the position of the stereoscopic image SI is the second position or the third position, it is preferable that the proportion distributed to the luminance of the first parallax image and the proportion distributed to the luminance of the second parallax image are greater than 0, as in the present embodiment.

The parallax image generator 86 of the control unit 80 generates, on the basis of the distribution ratio DR calculated by the luminance calculator 84, the first parallax image data expressing the first parallax image and the second parallax image data expressing the second parallax image. Specifically, the parallax image generator 86 generates the first parallax image data and the second parallax image data from the three-dimensional object data, the display surface data, and the distribution ratio DR calculated by the luminance calculator 84. The luminance of the first parallax image and the luminance of the second parallax image are, as described above, distributed from the luminance of the stereoscopic image SI in accordance with the position of the stereoscopic image SI. The parallax image generator 86 outputs the first parallax image data and the second parallax image data to the display image generator 88.

The display image generator 88 of the control unit 80 generates, from the first parallax image data, first right eye image data expressing the first right eye image PR1 to be displayed on the right eye display device 20R and first left eye image data expressing the first left eye image PL1 to be displayed on the left eye display device 20L. Additionally, the display image generator 88 generates, from the second parallax image data, second right eye image data expressing the second right eye image PR2 to be displayed on the right eye display device 20R and second left eye image data expressing the second left eye image PL2 to be displayed on the left eye display device 20L. The display image generator 88 outputs the first right eye image data, the first left eye image data, the second right eye image data, and the second left eye image data to the storage 82 (frame memory), and stores these pieces of data in the storage 82. In the following, the first right eye image data, the first left eye image data, the second right eye image data, and the second left eye image data may be referred to collectively as "display image data."

The display driver 92 of the control unit 80 sequentially reads the display image data from the storage 82, and generates a first right eye image signal for displaying the first right eye image, a first left eye image signal for displaying the first left eye image, a second right eye image signal for displaying the second right eye image, and a second left eye image signal for displaying the second left eye image. In the following, the first right eye image signal, the first left eye image signal, the second right eye image signal, and the second left eye image signal may be collectively referred to as "image signals."

The display driver 92 supplies the image signals together with a synchronization signal to the display unit 20. Specifically, the display driver 92 supplies the first right eye image signal and the second right eye image signal to the right eye liquid crystal display panel 22R of the right eye display device 20R, and supplies the first left eye image signal and the second left eye image signal to the left eye liquid crystal display panel 22L of the left eye display device 20L. Additionally, the display driver 92 supplies a synchronization signal to the optical driver 94.

In the present embodiment, the display driver 92 supplies the image signals to the right eye liquid crystal display panel 22R and the left eye liquid crystal display panel 22L on a 120 Hz cycle (period of one frame: 8.4 ms). The right eye liquid crystal display panel 22R and the left eye liquid crystal display panel 22L perform line progressive scanning (that is, writing to the pixels P) on a 120 Hz cycle.

The image signals and the polarity of the voltage written to each pixel P are described using a case in which the stereoscopic image SI is formed at the third position (L2≤L) as an example. Note that cases in which the stereoscopic image SI is formed at the first position and cases in which the stereoscopic image SI is formed at the second position are the same as the case in which the stereoscopic image SI is formed at the third position.

Figure 12:
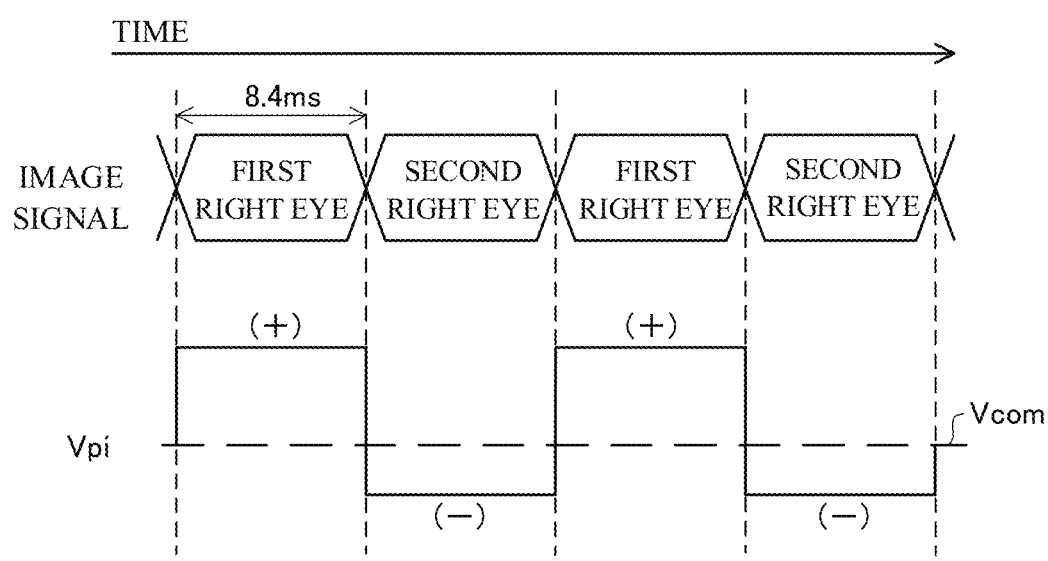
FIG. 12 is a schematic drawing for explaining an image signal and the polarity of voltage written to each pixel according to Embodiment 1.
Figure 13:
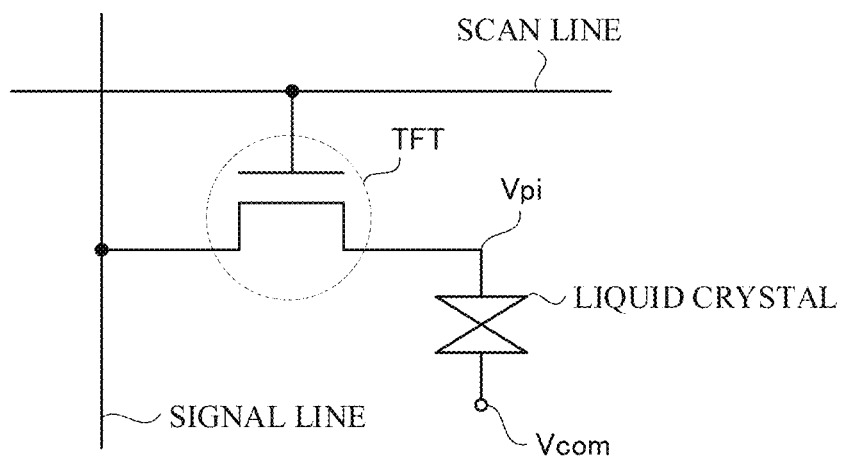
FIG. 13 is a schematic drawing illustrating a pixel circuit according to Embodiment 1.

As illustrated in FIG. 12, the display driver 92 alternately supplies the first right eye image signal and the second right eye image signal to the right eye liquid crystal display panel 22R one frame at a time, and the right eye liquid crystal display panel 22R sequentially displays the first right eye image and the second right eye image. In this case, it is preferable that the polarity of the voltage written to each pixel P of the right eye liquid crystal display panel 22R is inverted at each writing (at each frame). Specifically, in the pixel circuit illustrated in FIG. 13, at each writing, the display driver 92 inverts the magnitude relationship between the potential Vcom of the common electrode of the right eye liquid crystal display panel 22R and the potential Vpi of the TFT side of the right eye liquid crystal display panel 22R (FIG. 12). Such a configuration enables the suppression of burn-in of the display of the right eye liquid crystal display panel 22R.

Meanwhile, the display driver 92 supplies the first left eye image signal to the left eye liquid crystal display panel 22L in synchronization with the first right eye image signal, and supplies the second left eye image signal to the left eye liquid crystal display panel 22L in synchronization with the second right eye image signal. The left eye liquid crystal display panel 22L sequentially displays the first left eye image and the second left eye image. The first left eye image and the first right eye image are displayed simultaneously, and the second left eye image and the second right eye image are displayed simultaneously. As with the pixel P of the right eye liquid crystal display panel 22R, it is preferable that the polarity of the voltage written to each pixel P of the left eye liquid crystal display panel 22L is inverted at each writing.

The optical driver 94 of the control unit 80 generates a switching signal on the basis of the synchronization signal supplied from the display driver 92. The optical driver 94 supplies the switching signal to the polarization switcher 50 of the right eye lens unit 40R and the left eye lens unit 40L. In the present embodiment, in a case in which the first right eye image is displayed on the right eye liquid crystal display panel 22R and the first left eye image is displayed on the left eye liquid crystal display panel 22L, the optical driver 94 supplies the switching signal at the ON level to the polarization switcher 50.

Figure 14:
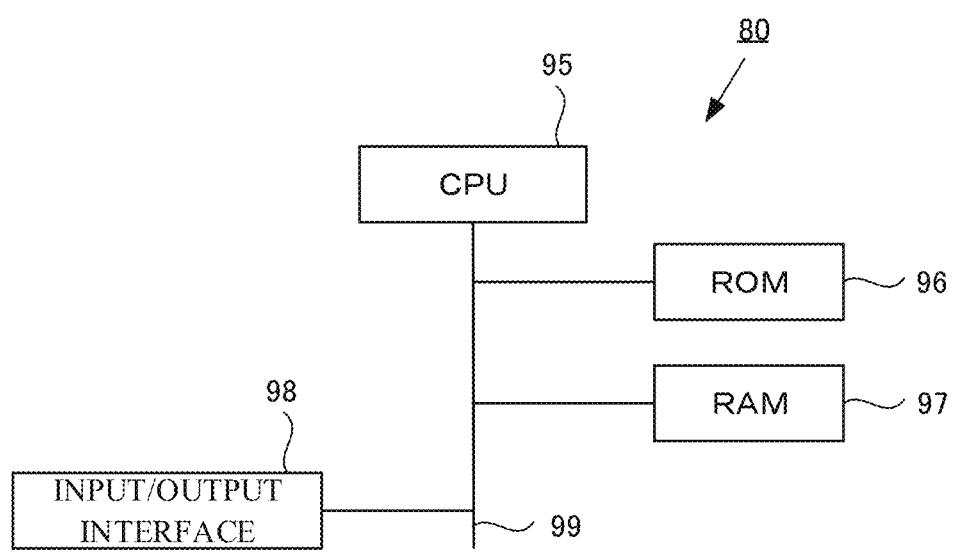
FIG. 14 is a drawing illustrating the hardware configuration of the control unit according to Embodiment 1.

FIG. 14 illustrates the hardware configuration of the control unit 80. The control unit 80 includes a central processing unit (CPU) 95, a read-only memory (ROM) 96, a random access memory (RAM) 97, and an input/output interface 98. The CPU 95, the ROM 96, the RAM 97, and the input/output interface 98 are connected by a bus 99. The CPU 95 executes various types of processings. The ROM 96 stores programs and data. The RAM 97 stores data. The input/output interface 98 inputs and outputs signals between the CPU 95, and the display unit 20 (the right eye liquid crystal display panel 22R and the left eye liquid crystal display panel 22L), the variable focus lens unit 40 (the polarization switcher 50), and external devices. The CPU 95 executes the programs stored in the ROM 96 to realize the functions of the control unit 80.

Thus, the three-dimensional-image display device 10 can suppress the conflicts among the physiological factors in stereoscopic viewing even when the stereoscopic image SI is formed at a position closer to the observer than the position of the first display surface 102 or is formed at a position farther from the observer than the position of the second display surface 104. Accordingly, the three-dimensional-image display device 10 can display the stereoscopic image SI across a wide range, and can suppress the conflicts among the physiological factors in stereoscopic viewing.

Embodiment 2

In Embodiment 1, in a case in which the stereoscopic image SI is formed at the second position (L≤L1), the three-dimensional-image display device 10 distributes the luminance of the stereoscopic image SI to the luminance of the first parallax image and the luminance of the second parallax image at a distribution ratio DR of 0.6:0.4. Additionally, in a case in which the stereoscopic image SI is formed at the third position (L2≤L), the three-dimensional-image display device 10 distributes the luminance of the stereoscopic image SI to the luminance of the first parallax image and the luminance of the second parallax image at a distribution ratio DR of 0.3:0.7.

In cases in which the stereoscopic image SI is formed at the second position or the third position, the distribution ratio DR for distributing the luminance of the stereoscopic image SI to the luminance of the first parallax image and the luminance of the second parallax image can be set as desired.

Figure 15:
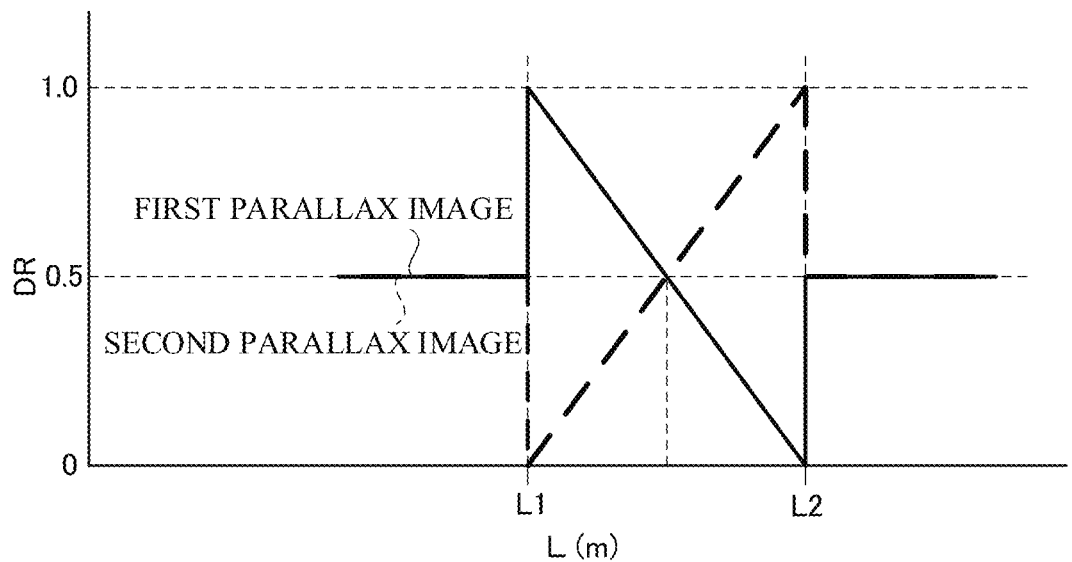
FIG. 15 is a schematic drawing illustrating a distribution ratio to a luminance of a first parallax image and to a luminance of a second parallax image according to Embodiment 2.
Figure 16:
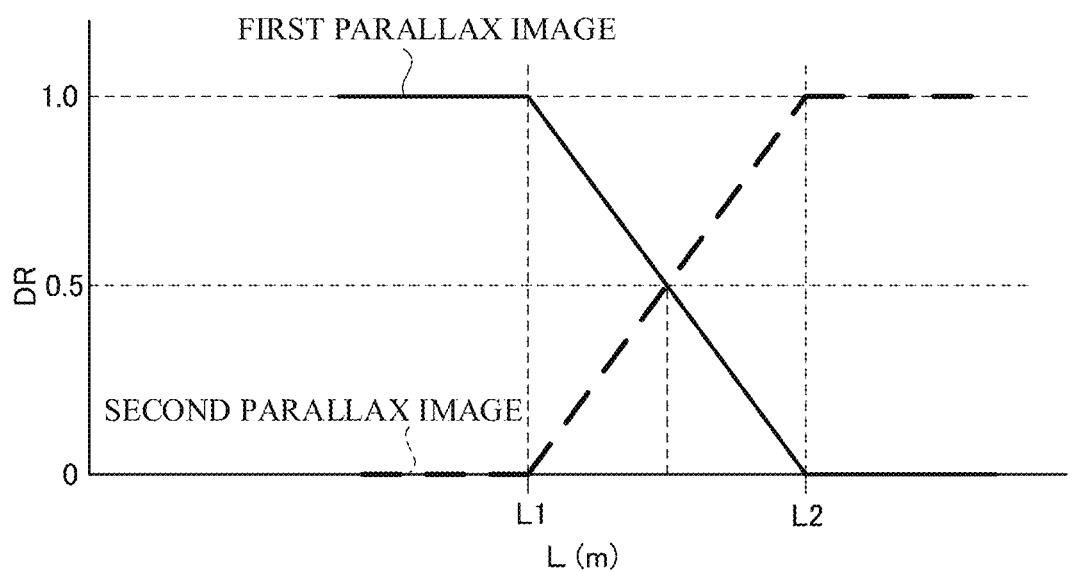
FIG. 16 is a schematic drawing illustrating the distribution ratio to the luminance of the first parallax image and to the luminance of the second parallax image according to Embodiment 2.
Figure 17:
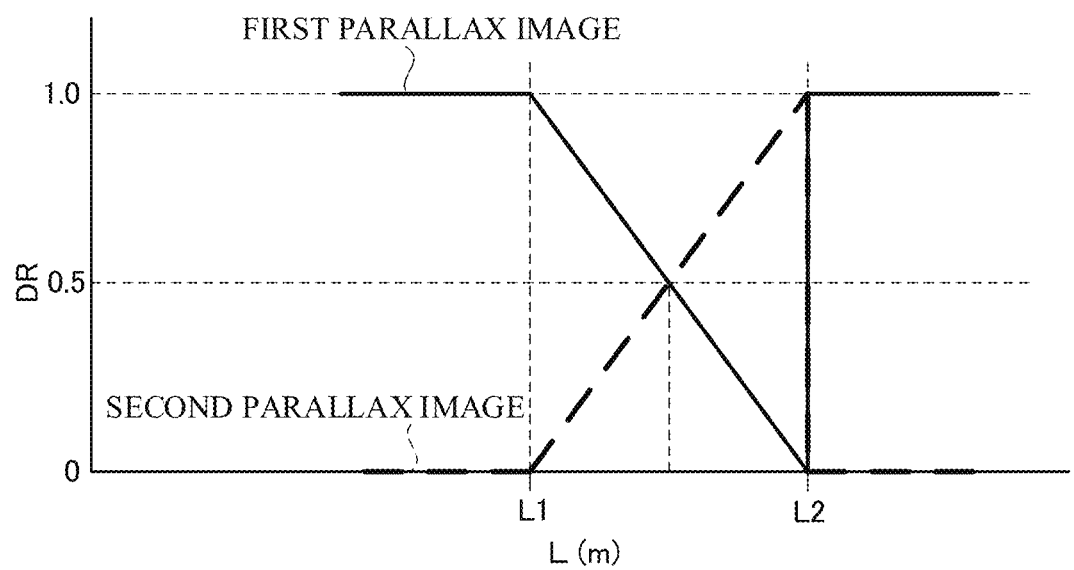
FIG. 17 is a schematic drawing illustrating the distribution ratio to the luminance of the first parallax image and to the luminance of the second parallax image according to Embodiment 2.

For example, a configuration is possible in which, in a case in which the stereoscopic image SI is formed at the second position or the third position (L≤L1, L2≤L), as illustrated in FIG. 15, the three-dimensional-image display device 10 (the control unit 80) distributes the luminance of the stereoscopic image SI to the luminance of the first parallax image and the luminance of the second parallax image at a distribution ratio DR of 0.5:0.5. Furthermore, a configuration is possible in which, in cases in which the stereoscopic image SI is formed at the second position or the third position (L≤L1, L2≤L), as illustrated in FIGS. 16 and 17, the three-dimensional-image display device 10 (the control unit 80) sets one of the proportion distributed to the luminance of the first parallax image and the proportion distributed to the luminance of the second parallax image to zero. In other words, a configuration is possible in which the three-dimensional-image display device 10 (the control unit 80) distributes the luminance (all of the luminance) of the stereoscopic image SI to the luminance of one parallax image.

Embodiment 3

In Embodiment 1, the display driver 92 of the control unit 80 alternately supplies the first right eye image signal and the second right eye image signal to the right eye liquid crystal display panel 22R one frame at a time, and alternately supplies the first left eye image signal and the second left eye image signal to the left eye liquid crystal display panel 22L one frame at a time. However, a configuration is possible in which the display driver 92 consecutively supplies, to the right eye liquid crystal display panel 22R and the left eye liquid crystal display panel 22L, the same image signal two times.

In the present embodiment, the display driver 92 supplies the image signals to the right eye liquid crystal display panel 22R and the left eye liquid crystal display panel 22L on a 240 Hz cycle (period of one frame: 4.2 ms). The right eye liquid crystal display panel 22R and the left eye liquid crystal display panel 22L perform writing to the pixels P on a 240 Hz cycle.

Figure 18:
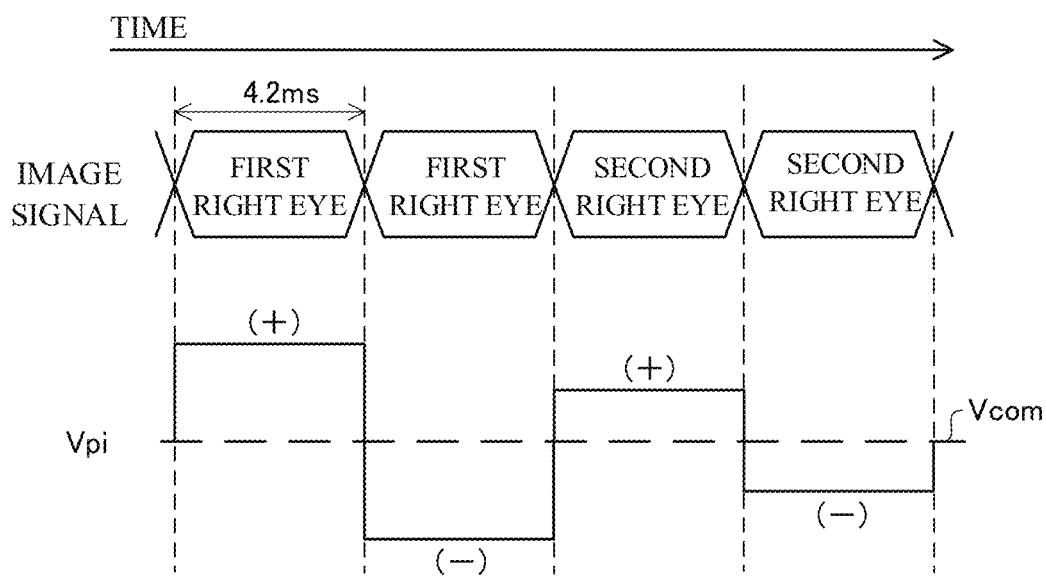
FIG. 18 is a schematic drawing for explaining an image signal and the polarity of voltage written to each pixel according to Embodiment 3.

The image signals and the polarity of the voltage written to each pixel P are described using a case in which the stereoscopic image SI is formed at the third position (L2≤L) as an example. As illustrated in FIG. 18, the display driver 92 consecutively supplies, to the right eye liquid crystal display panel 22R, the first right eye image signal two times and, then, consecutively supplies the second right eye image signal two times. Then, the right eye liquid crystal display panel 22R displays the first right eye image by the two consecutive frames and, then, displays the second right eye image by the two consecutive frames. In this case, it is preferable that the polarity of the voltage written to each pixel P of the right eye liquid crystal display panel 22R is inverted at each writing (at each frame). Specifically, as in Embodiment 1, in the pixel circuit illustrated in FIG. 13, at each writing, the display driver 92 inverts the magnitude relationship between the potential Vcom of the common electrode of the right eye liquid crystal display panel 22R and the potential Vpi of the TFT side of the right eye liquid crystal display panel 22R (FIG. 18).

As with the right eye liquid crystal display panel 22R, the display driver 92 consecutively supplies, to the left eye liquid crystal display panel 22L, the first left eye image signal two times and, then, consecutively supplies the second left eye image signal two times. The left eye liquid crystal display panel 22L displays the first left eye image by the two consecutive frames and, then, displays the second left eye image by the two consecutive frames. It is preferable that the polarity of the voltage written to each pixel P of the left eye liquid crystal display panel 22L is also inverted at each writing (at each frame).

Due to this configuration, the three-dimensional-image display device 10 can further suppress burn-in of the display of the right eye liquid crystal display panel 22R and the left eye liquid crystal display panel 22L.

Embodiment 4

In Embodiment 1, the polarity of the voltage written to each pixel P of the right eye liquid crystal display panel 22R and the left eye liquid crystal display panel 22L is inverted at each writing (at each frame). However, a configuration is possible in which, in the sequential displaying of the consecutive images, the display driver 92 makes the polarity of the voltage written to each pixel P of the right eye liquid crystal display panel 22R and the left eye liquid crystal display panel 22L the same and, to sequentially display the next consecutive images, inverts the polarity of the voltage written to each pixel P of the right eye liquid crystal display panel 22R and the left eye liquid crystal display panel 22L.

In the present embodiment, as in Embodiment 1, the display driver 92 supplies the image signals to the right eye liquid crystal display panel 22R and the left eye liquid crystal display panel 22L on a 120 Hz cycle (period of one frame: 8.4 ms). The right eye liquid crystal display panel 22R and the left eye liquid crystal display panel 22L perform writing to the pixels P on a 120 Hz cycle.

Figure 19:
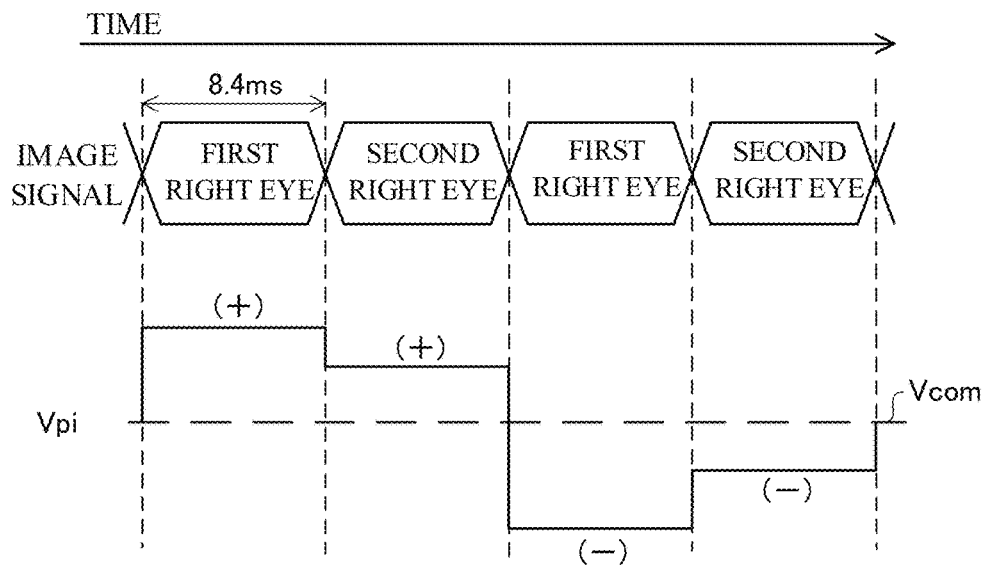
FIG. 19 is a schematic drawing for explaining an image signal and the polarity of voltage written to each pixel according to Embodiment 4.

The image signals and the polarity of the voltage written to each pixel P are described using a case in which the stereoscopic image SI is formed at the third position (L2≤L) as an example. As illustrated in FIG. 19, the display driver 92 consecutively supplies the first right eye image signal and the second right eye image signal to the right eye liquid crystal display panel 22R, and the right eye liquid crystal display panel 22R sequentially displays the first right eye image and the second right eye image by the consecutive frames. In the sequential displaying of the consecutive first right eye image and the second right eye image, the display driver 92 sets the polarity of the voltage written to each pixel P of the right eye liquid crystal display panel 22R to the same polarity. Moreover, to sequentially display the next consecutive first right eye image and the second right eye image, the display driver 92 inverts the polarity of the voltage written to each pixel P of the right eye liquid crystal display panel 22R.

As with the right eye liquid crystal display panel 22R, the display driver 92 consecutively supplies the first left eye image signal and the second left eye image signal to left eye liquid crystal display panel 22L, and the left eye liquid crystal display panel 22L sequentially displays the first left eye image and the second left eye image by the consecutive frames. In the sequential displaying of the consecutive first left eye image and second left eye image, the display driver 92 sets the polarity of the voltage to be written to each pixel P of the left eye liquid crystal display panel 22L to the same polarity and, to sequentially display the next consecutive first left eye image and second left eye image, inverts the polarity of the voltage to be written to each pixel P of the left eye liquid crystal display panel 22L.

Due to this configuration, the three-dimensional-image display device 10 can suppress burn-in of the display of the right eye liquid crystal display panel 22R and the left eye liquid crystal display panel 22L.

Embodiment 5

In Embodiment 1, the virtual image Pa1 of the first parallax image is displayed on the first display surface 102, and the virtual image Pa2 of the second parallax image is displayed on the second display surface 104. However, a configuration is possible in which the three-dimensional-image display device 10 displays virtual images of three or more parallax images respectively on three or more display surfaces.

Figure 20:
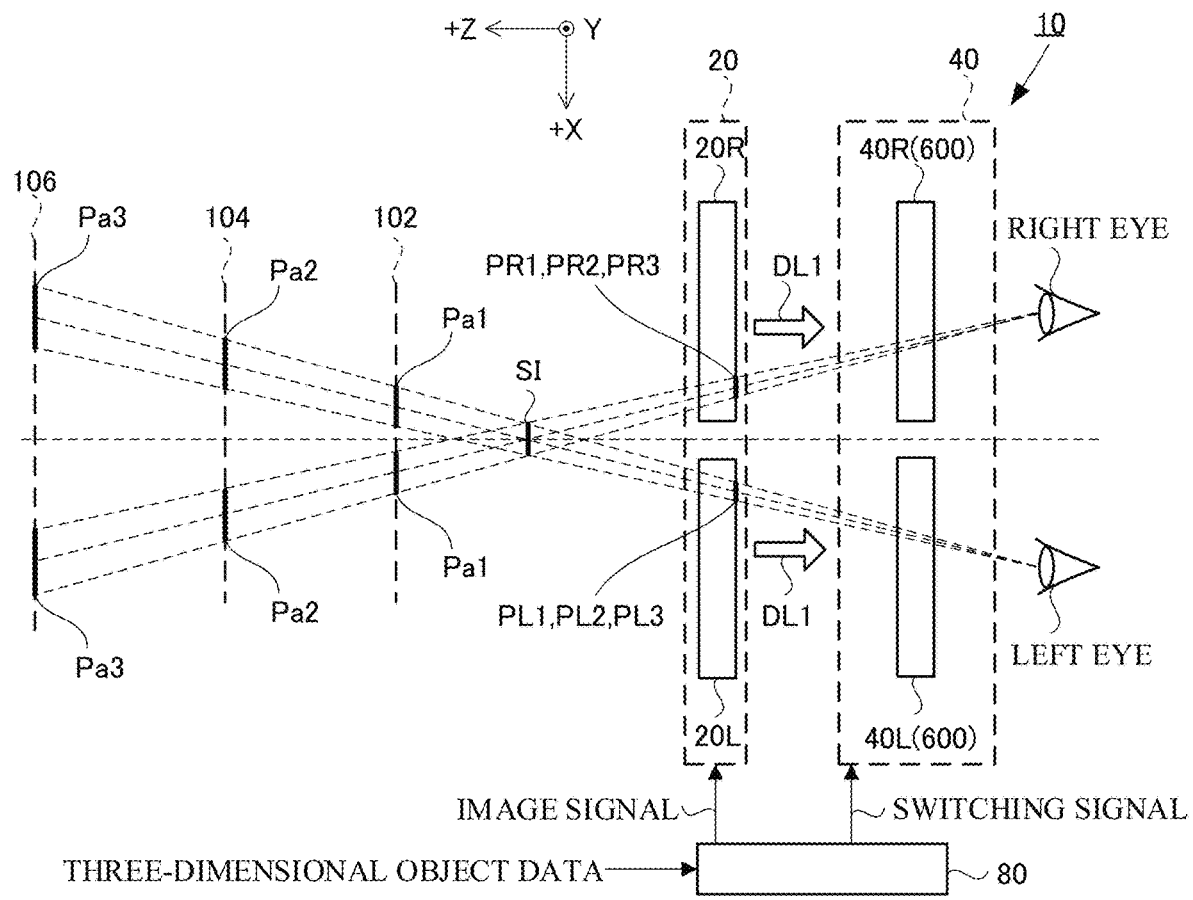
FIG. 20 is a schematic drawing illustrating a three-dimensional-image display device according to Embodiment 5.

In the present embodiment, as illustrated in FIG. 20, the three-dimensional-image display device 10 forms the stereoscopic image SI by respectively displaying the virtual image Pa1 of the first parallax image, the virtual image Pa2 of the second parallax image, and a virtual image Pa3 of a third parallax image on the first display surface 102, the second display surface 104, and a third display surface 106. As with the three-dimensional-image display device 10 of Embodiment 1, the three-dimensional-image display device 10 of the present embodiment includes a display unit 20, a variable focus lens unit 40, and a control unit 80.

The display unit 20 of the present embodiment sequentially displays the first parallax image, the second parallax image, and the third parallax image in time divisions. The first parallax image, the second parallax image, and the third parallax image are parallax images that are stereoscopically viewable. The display unit 20 emits display light DL1 of the first parallax image, the second parallax image, and the third parallax image as polarized light for which the polarization direction is a predetermined first direction (the X direction). As in Embodiment 1, the display unit 20 of the present embodiment includes a right eye display device 20R and a left eye display device 20L.

The right eye display device 20R sequentially displays the first right eye image PR1, the second right eye image PR2, and a third right eye image PR3 in time divisions. The left eye display device 20L sequentially displays the first left eye image PL1, the second left eye image PL2, and a third left eye image PL3 in time divisions. The first right eye image PR1 and the first left eye image PL1 form the first parallax image. The second right eye image PR2 and the second left eye image PL2 form the second parallax image, and the third right eye image PR3 and the third left eye image PL3 form the third parallax image. The other configurations of the right eye display device 20R and the left eye display device 20L are the same as those of the right eye display device 20R and the left eye display device 20L of Embodiment 1.

The variable focus lens unit 40 the present embodiment switches between a focal distance for the display light DL1 of the first parallax image, a focal distance for the display light DL1 of the second parallax image, and a focal distance for the display light DL1 of the third parallax image to respectively form, as virtual images, the first parallax image, the second parallax image, and the third parallax image on the first display surface 102, the second display surface 104, and the third display surface 106 positioned in the depth direction from the perspective of an observer. In the present embodiment, as illustrated in FIG. 20, the first display surface 102, the second display surface 104, and the third display surface 106 are positioned, from the observer side, in the order of the first display surface 102, the second display surface 104, and the third display surface 106. The first display surface 102 of the present embodiment corresponds to the closest display surface, and the third display surface 106 of the present embodiment corresponds to the farthest display surface.

Figure 21:
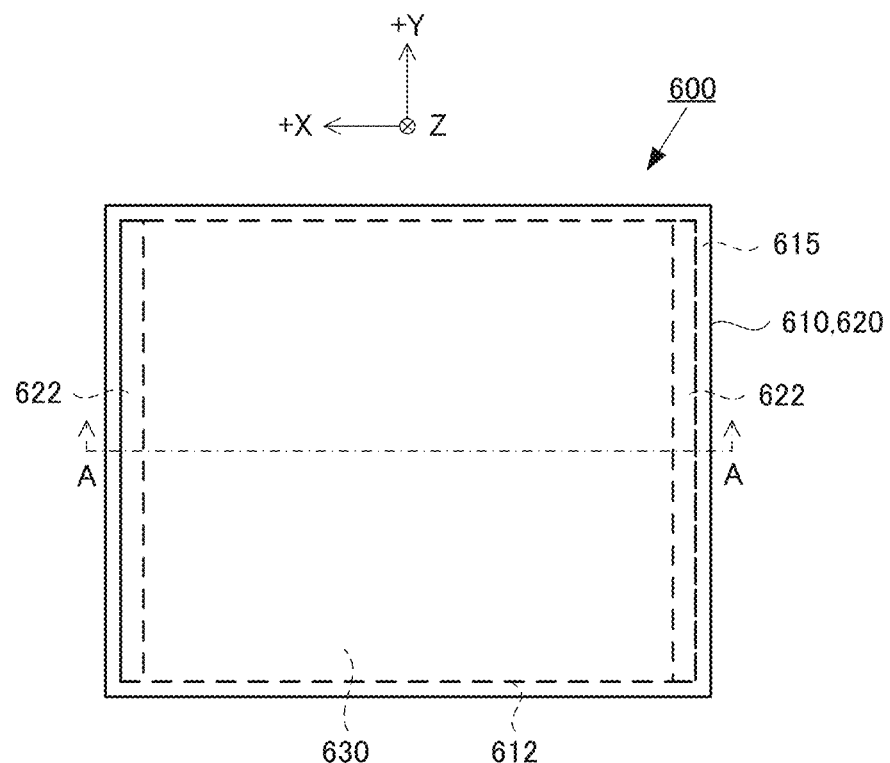
FIG. 21 is a plan view illustrating a liquid crystal lens according to Embodiment 5.
Figure 22:
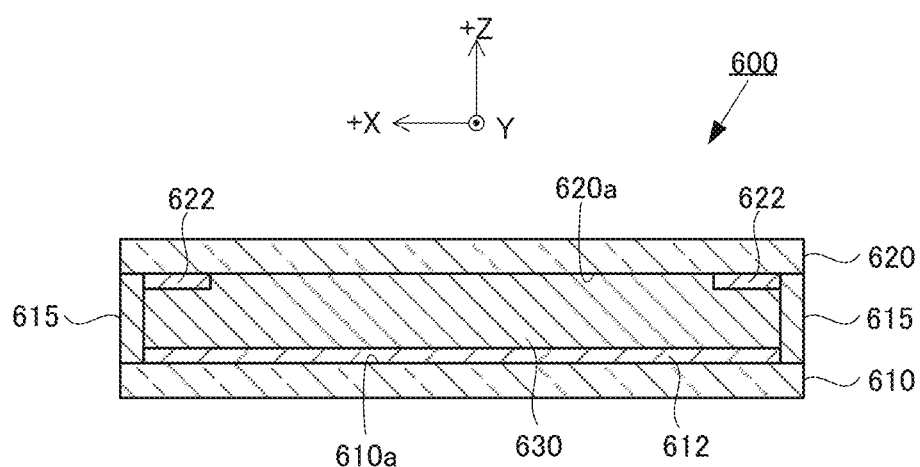
FIG. 22 is a cross-sectional view of the liquid crystal lens illustrated in FIG. 21, taken along line A-A.

As in Embodiment 1, the variable focus lens unit 40 of the present embodiment includes a right eye lens unit 40R and a left eye lens unit 40L. The right eye lens unit 40R is disposed between the right eye display device 20R and the right eye of the observer, and the left eye lens unit 40L is disposed between the left eye display device 20L and the left eye of the observer. The right eye lens unit 40R of the present embodiment is implemented as a liquid crystal lens 600. As a result of voltage being applied, the liquid crystal lens 600 changes the focal distance for the polarized light having the predetermined first direction as the polarization direction. Specifically, the liquid crystal lens 600 changes, on the basis of a switching signal that is supplied from the control unit 80, the focal distance for the display light DL1 emitted from the display unit 20. As illustrated in FIGS. 21 and 22, the liquid crystal lens 600 includes a third light-transmitting substrate 610, a fourth light-transmitting substrate 620, and a liquid crystal 630.

In one example, the third light-transmitting substrate 610 is implemented as a flat glass substrate. The third light-transmitting substrate 610 and the fourth light-transmitting substrate 620 are adhered to each other by a sealing material 615. The third light-transmitting substrate 610 and the fourth light-transmitting substrate 620 sandwich the liquid crystal 630. The third light-transmitting substrate 610 includes a first electrode 612 and an alignment film (not illustrated).

The first electrode 612 of the third light-transmitting substrate 610 is formed in a rectangular shape on a first main surface 610a of the third light-transmitting substrate 610. The first electrode 612 faces second electrodes 622 of the fourth light-transmitting substrate 620 (described later). The first electrode 612 is connected to the control unit 80.

The alignment film of the third light-transmitting substrate 610 is provided on the first electrode 612. The alignment film aligns the liquid crystal 630 with the X direction. In one example, the alignment film is implemented as a polyimide alignment film that has been subjected to a rubbing treatment.

As with the third light-transmitting substrate 610, the fourth light-transmitting substrate 620 is implemented as a flat glass substrate. The fourth light-transmitting substrate 620 includes two second electrodes 622 and an alignment film (not illustrated).

The two second electrodes 622 of the fourth light-transmitting substrate 620 are respectively disposed on a +X side end and a −X side end of the first main surface 620a of the fourth light-transmitting substrate 620. Each of the second electrodes 622 extends in the Y direction and is connected to the control unit 80.

The alignment film of the fourth light-transmitting substrate 620 is provided on the first main surface 620a and the second electrodes 622. As with the alignment film of the third light-transmitting substrate 610, the alignment film aligns the liquid crystal 630 with the X direction.

The liquid crystal 630 is implemented as a nematic liquid crystal that has positive dielectric anisotropy and positive refractive index anisotropy. When voltage is not applied, the liquid crystal 630 is aligned with the X direction.

When viewing an XZ cross-section of the liquid crystal lens 600, potential having a quadratic curve shape is formed between the two second electrodes 622 as a result of voltage being applied between the first electrode 612 and the second electrodes 622. The liquid crystal 630 is aligned along the formed quadratic curve-shaped potential. Due to the liquid crystal 630 being aligned along the quadratic curve-shaped potential, the liquid crystal lens 600 functions as a lens for the display light DL1 emitted from the display unit 20. The focal distance of the liquid crystal lens 600 is dependent on the value of the applied voltage.

In the present embodiment, when a predetermined first voltage is applied between the first electrode 612 and the second electrodes 622, the liquid crystal lens 600 switches the focal distance for the display light DL1 to a first focal distance, thereby forming the first right eye image PR1 on the first display surface 102. Additionally, when a predetermined second voltage (first voltage<second voltage) is applied between the first electrode 612 and the second electrodes 622, the liquid crystal lens 600 switches the focal distance for the display light DL1 to a second focal distance, thereby forming the second right eye image PR2 on the second display surface 104. Furthermore, when a predetermined third voltage (second voltage<third voltage) is applied between the first electrode 612 and the second electrodes 622, the liquid crystal lens 600 switches the focal distance for the display light DL1 to a third focal distance, thereby forming the third right eye image PR3 on the third display surface 106.

As with the right eye lens unit 40R of the present embodiment, the left eye lens unit 40L is implemented as a liquid crystal lens 600. The left eye lens unit 40L respectively forms the first left eye image PL1, the second left eye image PL2, and the third left eye image PL3 as a virtual image from the perspective of the observer on the first display surface 102, the second display surface 104, and the third display surface 106.

The control unit 80 of the present embodiment controls the display unit 20 and the variable focus lens unit 40. The control unit 80 generates, on the basis of three-dimensional object data inputted from a non-illustrated external device, the first parallax image data, the second parallax image data, and third parallax image data expressing the third parallax image. In the generation of the first parallax image data, the second parallax image data, and the third parallax image, the control unit 80 distributes, in accordance with the position of the stereoscopic image SI, the luminance of the stereoscopic image SI to the luminance of the first parallax image, the luminance of the second parallax image, and the luminance of the third parallax image.

Next, the distribution of the luminance of the stereoscopic image SI and the polarity of the voltage written to each pixel P are described. The other configurations of the control unit 80 are the same as for the control unit 80 of Embodiment 1.

Firstly, the distribution of the luminance of the stereoscopic image SI is described. In the present embodiment, as illustrated in FIGS. 23 to 26, a distance between the observer and a crossing point of the straight line S2 with the third display surface 106 (hereinafter referred to as "distance between the observer and the third display surface 106") is defined as L3. Furthermore, on the straight line S2, a position between the first display surface 102 (the closest display surface) and the third display surface 106 (the farthest display surface) is defined as a first position, a position at which the distance from the observer is less than or equal to the distance L1 between the observer and the first display surface 102 (the closest display surface) is defined as a second position, and a position at which the distance from the observer is greater than or equal to a distance L3 between the observer and the third display surface 106 (the farthest display surface) is defined as a third position. The distance L between the observer and the stereoscopic image SI, the distance L1 between the observer and the first display surface 102, and the like are the same as in Embodiment 1.

Figure 23:
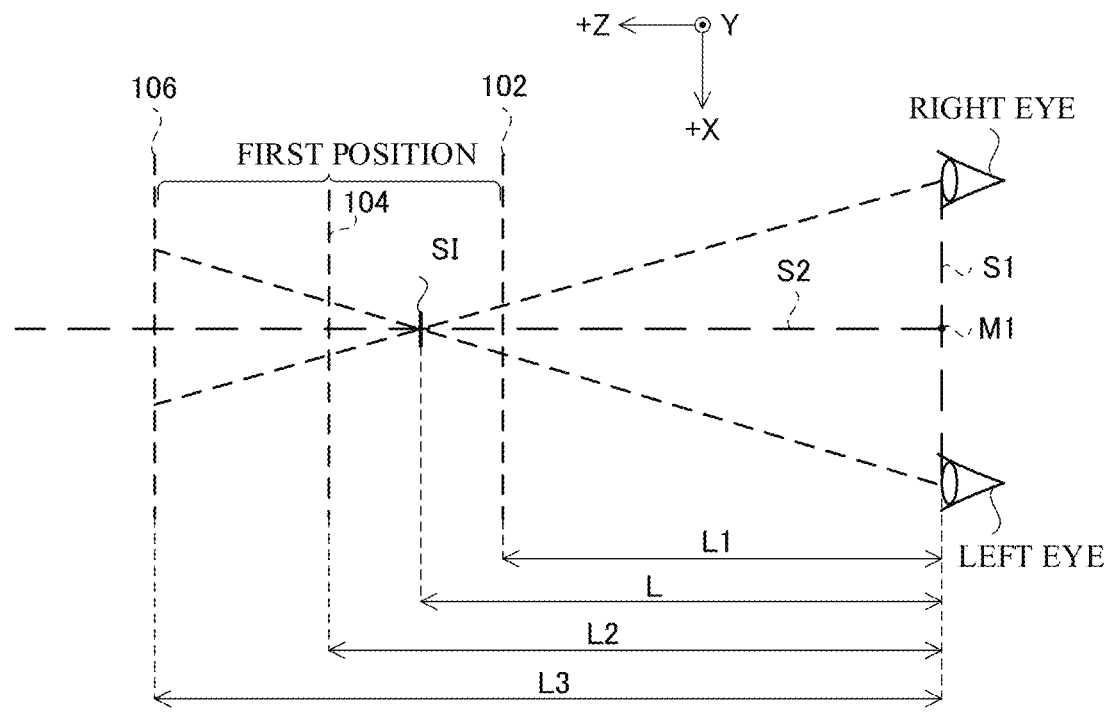
FIG. 23 is a schematic drawing illustrating a stereoscopic image displayed at a first position according to Embodiment 5.
Figure 24:
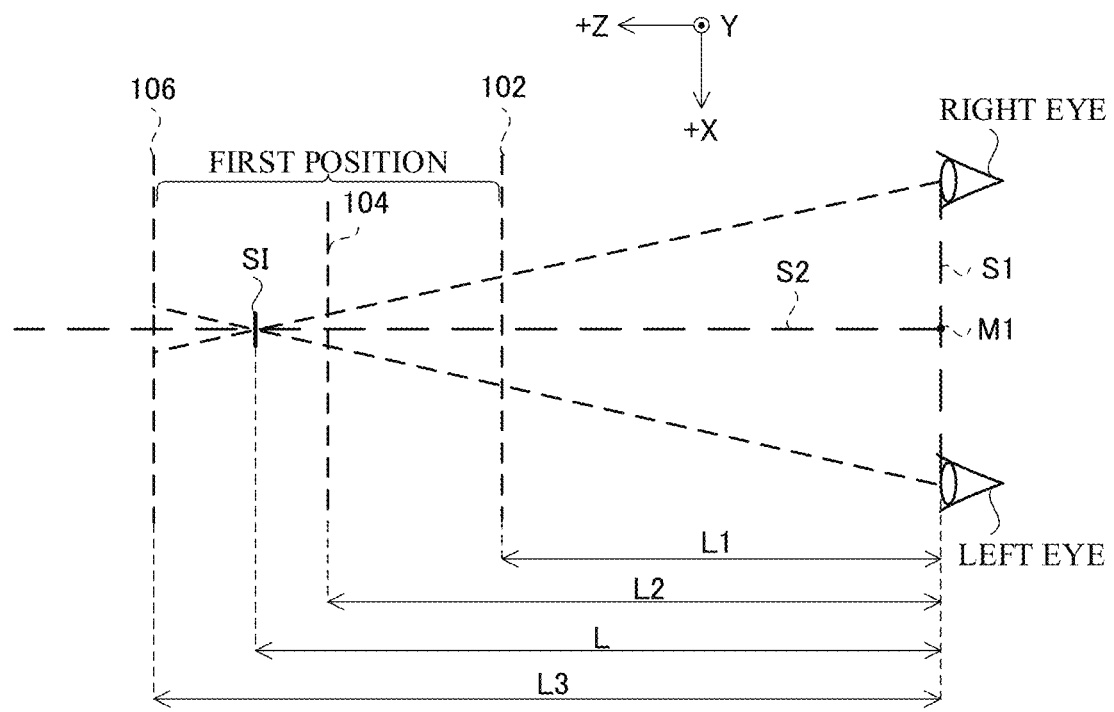
FIG. 24 is a schematic drawing illustrating the stereoscopic image displayed at the first position according to Embodiment 5.
Figure 27:
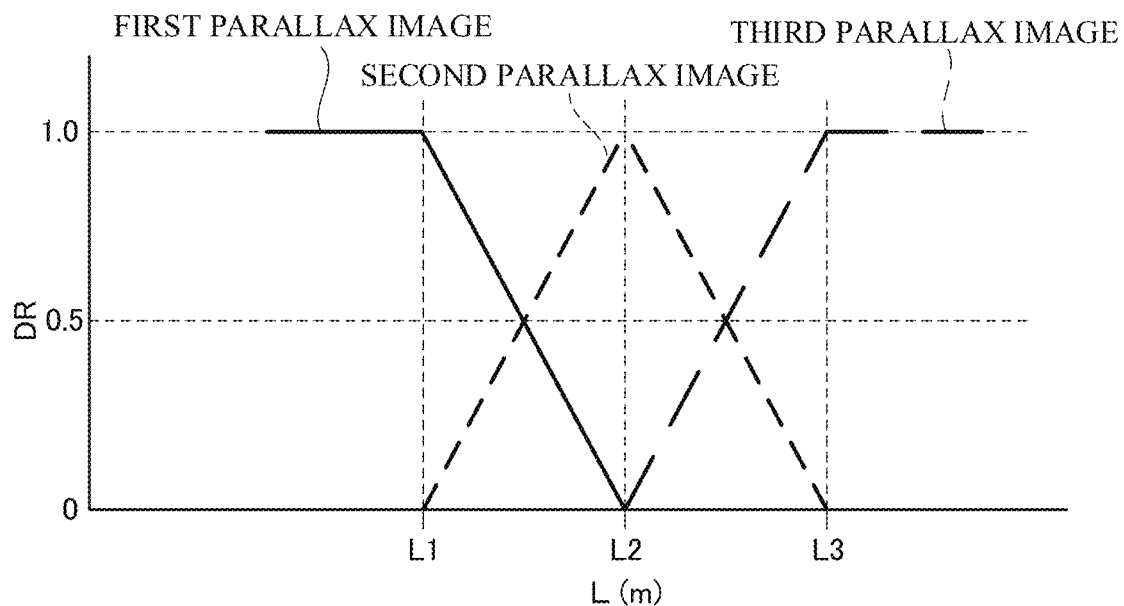
FIG. 27 is a schematic drawing illustrating a distribution ratio to a luminance of a first parallax image, a luminance of a second parallax image, and a luminance of a third parallax image according to Embodiment 5.

In a case in which the stereoscopic image SI is formed at the first position (L1<L<L3) as illustrated in FIGS. 23 and 24, the control unit 80 (the luminance calculator 84), in a manner similar to a DFD-type three-dimensional-image display device, changes, in accordance with the distance L between the observer and the stereoscopic image SI, the distribution ratio DR for distributing the luminance of the stereoscopic image SI to the luminance of the first parallax image, the luminance of the second parallax image, and the luminance of the third parallax image as illustrated in FIG. 27. In the present embodiment, in a case in which the stereoscopic image SI is formed between the first display surface 102 and the second display surface 104 (FIG. 23), the control unit 80 sets the proportion distributed to the luminance of the third parallax image to zero and, also, increases the proportion distributed to the luminance of the first parallax image as the position at which the stereoscopic image SI is formed approaches the first display surface 102, and increases the proportion distributed to the luminance of the second parallax image as the position at which the stereoscopic image SI is formed approaches the second display surface 104. Additionally, in a case in which the stereoscopic image SI is formed between the second display surface 104 and the third display surface 106 (FIG. 24), the control unit 80 sets the proportion distributed to the luminance of the first parallax image to zero and, also, increases the proportion distributed to the luminance of the second parallax image as the position at which the stereoscopic image SI is formed approaches the second display surface 104, and increases the proportion distributed to the luminance of the third parallax image as the position at which the stereoscopic image SI is formed approaches the third display surface 106. In a case in which the stereoscopic image SI is formed at the first position, as in Embodiment 1, the observer perceives that the focal point of the eyes is located at the position of the stereoscopic image SI. Additionally, the observer perceives that the distance from the stereoscopic image SI due to parallax and convergence coincides with the distance from the stereoscopic image SI due to the focus of the eyes. Accordingly, the three-dimensional-image display device 10 can suppress the conflicts among the physiological factors in stereoscopic viewing, and display the stereoscopic image SI.

Figure 25:
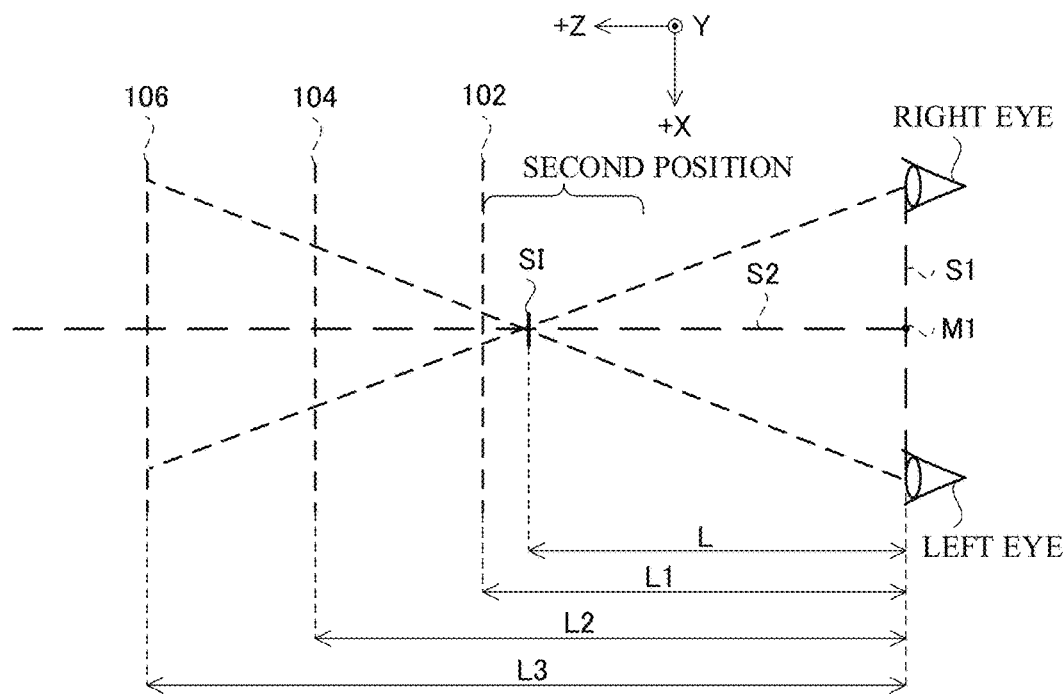
FIG. 25 is a schematic drawing illustrating the stereoscopic image displayed at a second position according to Embodiment 5.

As illustrated in FIG. 25, in a case in which the stereoscopic image SI is formed at the second position (L≤L1), as illustrated in FIG. 27, the control unit 80 distributes the luminance of the stereoscopic image SI to the luminance of the first parallax image, the luminance of the second parallax image, and the luminance of the third parallax image, and sets the distribution ratio DR to constant, regardless of the distance L between the observer and the stereoscopic image SI. In the present embodiment, the distribution ratio DR for distributing to the luminance of the first parallax image, the luminance of the second parallax image, and the luminance of the third parallax image is 1.0:0.0:0.0. In the present embodiment as well, the distribution ratio DR is set to constant and, as such, the three-dimensional-image display device 10 can display the stereoscopic image SI at the correct luminance. It is preferable that the control unit 80 sets the proportion distributed to the luminance of the first parallax image, the virtual image of which is displayed on the first display surface 102, to greater than or equal to the proportions distributed to the luminance of the second parallax image and the luminance of the third parallax image.

Furthermore, as in Embodiment 1, it is preferable that the distance L between the observer and the stereoscopic image SI and the distance L1 between the observer and the first display surface 102 satisfy Equation (3). Due to this configuration, the three-dimensional-image display device 10 can suppress the conflicts among the physiological factors in stereoscopic viewing.

Figure 26:
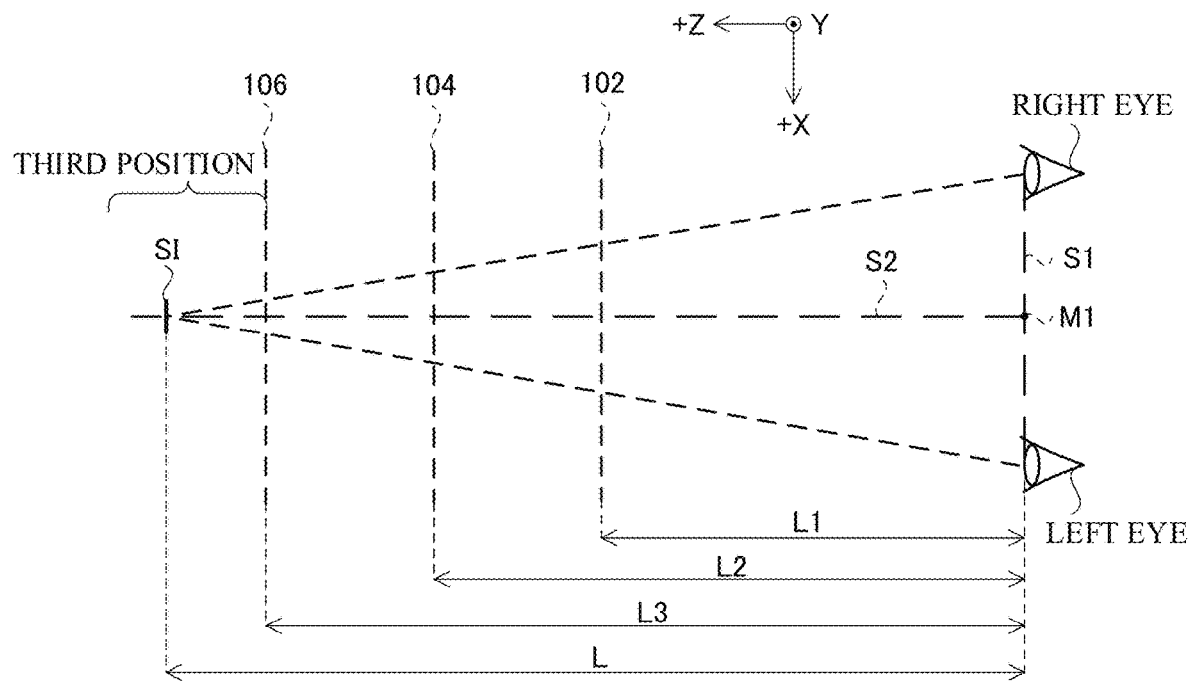
FIG. 26 is a schematic drawing illustrating the stereoscopic image displayed at a third position according to Embodiment 5.

As illustrated in FIG. 26, in a case in which the stereoscopic image SI is formed at the third position (L≥L3), as illustrated in FIG. 27, the control unit 80 distributes the luminance of the stereoscopic image SI to the luminance of the first parallax image, the luminance of the second parallax image, and the luminance of the third parallax image, and sets the distribution ratio DR to constant, regardless of the distance L between the observer and the stereoscopic image SI. In the present embodiment, the distribution ratio DR for distributing to the luminance of the first parallax image, the luminance of the second parallax image, and the luminance of the third parallax image is 0.0:0.0:1.0.

In the present embodiment as well, the distribution ratio DR is set to constant and, as such, the three-dimensional-image display device 10 can display the stereoscopic image SI at the correct luminance due to binocular disparity. It is preferable that the control unit 80 sets the proportion distributed to the luminance of the third parallax image, the virtual image of which is displayed on the third display surface 106, to greater than or equal to the proportions distributed to the luminance of the first parallax image and the luminance of the second parallax image.

Furthermore, it is preferable that the distance L between the observer and the stereoscopic image SI and the distance L3 between the observer and the third display surface 106 satisfy Equation (6) below (where L≥L2). Due to this configuration, as in Embodiment 1, the three-dimensional-image display device 10 can suppress the conflicts among the physiological factors in stereoscopic viewing.

$$\frac{1}{L3} - \frac{1}{L} < 0.3 \quad (6)$$

Next, the polarity of the voltage written to each pixel P is described using the right eye liquid crystal display panel 22R as an example. In the present embodiment, the control unit 80 (the display driver 92) supplies the image signals to the right eye liquid crystal display panel 22R on a 180 Hz cycle (period of one frame: 5.6 ms). The right eye liquid crystal display panel 22R performs the writing to the pixels P on a 180 Hz cycle.

Here, the image signals and the polarity of the voltage written to each of the pixels P are described using a case in which the stereoscopic image SI is formed at the first position (L1<L<L3, between the first display surface 102 and the second display surface 104) as an example.

Figure 28:
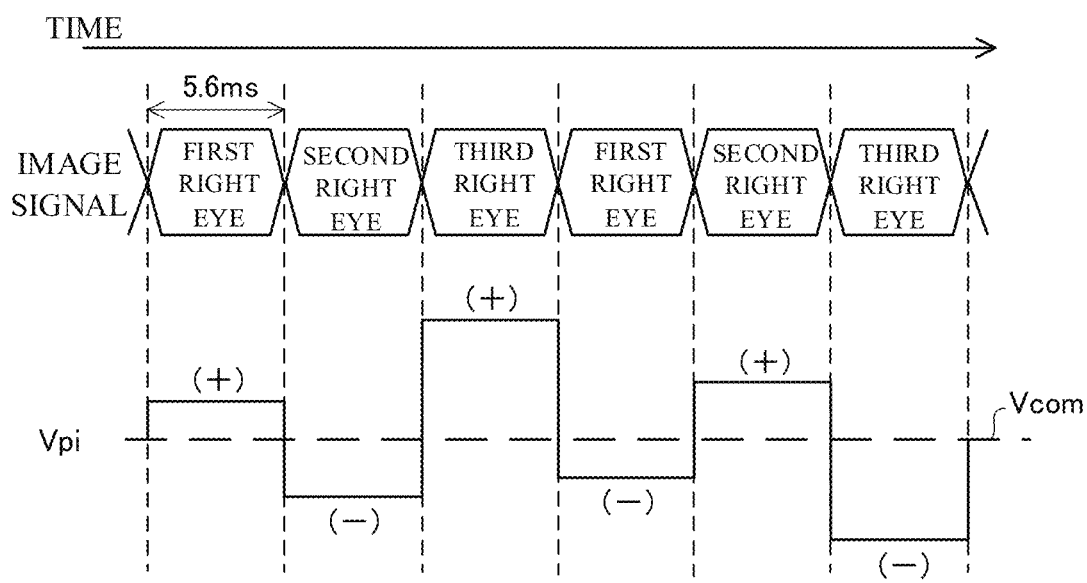
FIG. 28 is a schematic drawing for explaining an image signal and the polarity of voltage written to each pixel according to Embodiment 5.

As illustrated in FIG. 28, the control unit 80 (the display driver 92) sequentially supplies, one frame at a time, the first right eye image signal, the second right eye image signal, and a third right eye image signal for displaying a third right eye image to the right eye liquid crystal display panel 22R, and the right eye liquid crystal display panel 22R sequentially displays the first right eye image, the second right eye image, and the third right eye image. In this case, the polarity of the voltage written to each pixel P of the right eye liquid crystal display panel 22R is inverted at each writing (at each frame). Due to this configuration, the three-dimensional-image display device 10 can suppress burn-in of the display of the right eye liquid crystal display panel 22R.

In the present embodiment, in particular, the number of display surfaces is an odd number (three) and, as such, the polarity of the voltage written in the displaying of one first right eye image and the polarity of the voltage written in the displaying of the next first right eye image are inverted. Additionally, the polarity of the voltage written in the displaying of one second right eye image and the polarity of the voltage written in the displaying of the next second right eye image, and the polarity of the voltage written in the displaying of one third right eye image and the polarity of the voltage written in the displaying of the next third right eye image are inverted. Accordingly, the three-dimensional-image display device 10 can further suppress burn-in of the display of the right eye liquid crystal display panel 22R. As with the display of the right eye liquid crystal display panel 22R, the three-dimensional-image display device 10 can further suppress burn-in of the display of the left eye liquid crystal display panel 22L.

As described above, the three-dimensional-image display device 10 of the present embodiment displays the stereoscopic image SI by respectively displaying the virtual image Pa1 of the first parallax image, the virtual image Pa2 of the second parallax image, and the virtual image Pa3 of the third parallax image on the first display surface 102, the second display surface 104, and the third display surface 106. The three-dimensional-image display device 10 of the present embodiment can suppress the conflicts among the physiological factors in stereoscopic viewing even when the stereoscopic image SI is formed at a position closer to the observer than the position of the first display surface 102 or is formed at a position farther from the observer than the position of the third display surface 106. Accordingly, the three-dimensional-image display device 10 of the present embodiment also can display the stereoscopic image SI across a wide range, and can suppress the conflicts among the physiological factors in stereoscopic viewing. Furthermore, the number of display surfaces is an odd number and, as such, the three-dimensional-image display device 10 can further suppress burn-in of the display of the right eye liquid crystal display panel 22R and the left eye liquid crystal display panel 22L.

Modified Examples

Embodiments have been described, but various modifications can be made to the present disclosure without departing from the spirit and scope of the present disclosure. In the following, the first parallax image to the third parallax image may be referred to as parallax images, the first right eye image PR1 to the third right eye image PR3 may be referred to as right eye images, and the first left eye image PL1 to the third left eye image PL3 may be referred to as left eye images.

In the embodiments, the right eye display device 20R and the left eye display device 20L of the display unit 20 include liquid crystal display panels (right eye liquid crystal display panel 22R, left eye liquid crystal display panel 22L) and the light source 32, but the configurations of the right eye display device 20R and the left eye display device 20L are not limited thereto. For example, a configuration is possible in which the right eye display device 20R and the left eye display device 20L include a self-luminous display panel and a polarizing plate. The self-luminous display panel is an organic electro luminescence (EL) display panel that is active matrix driven by a TFT.

Figure 29:
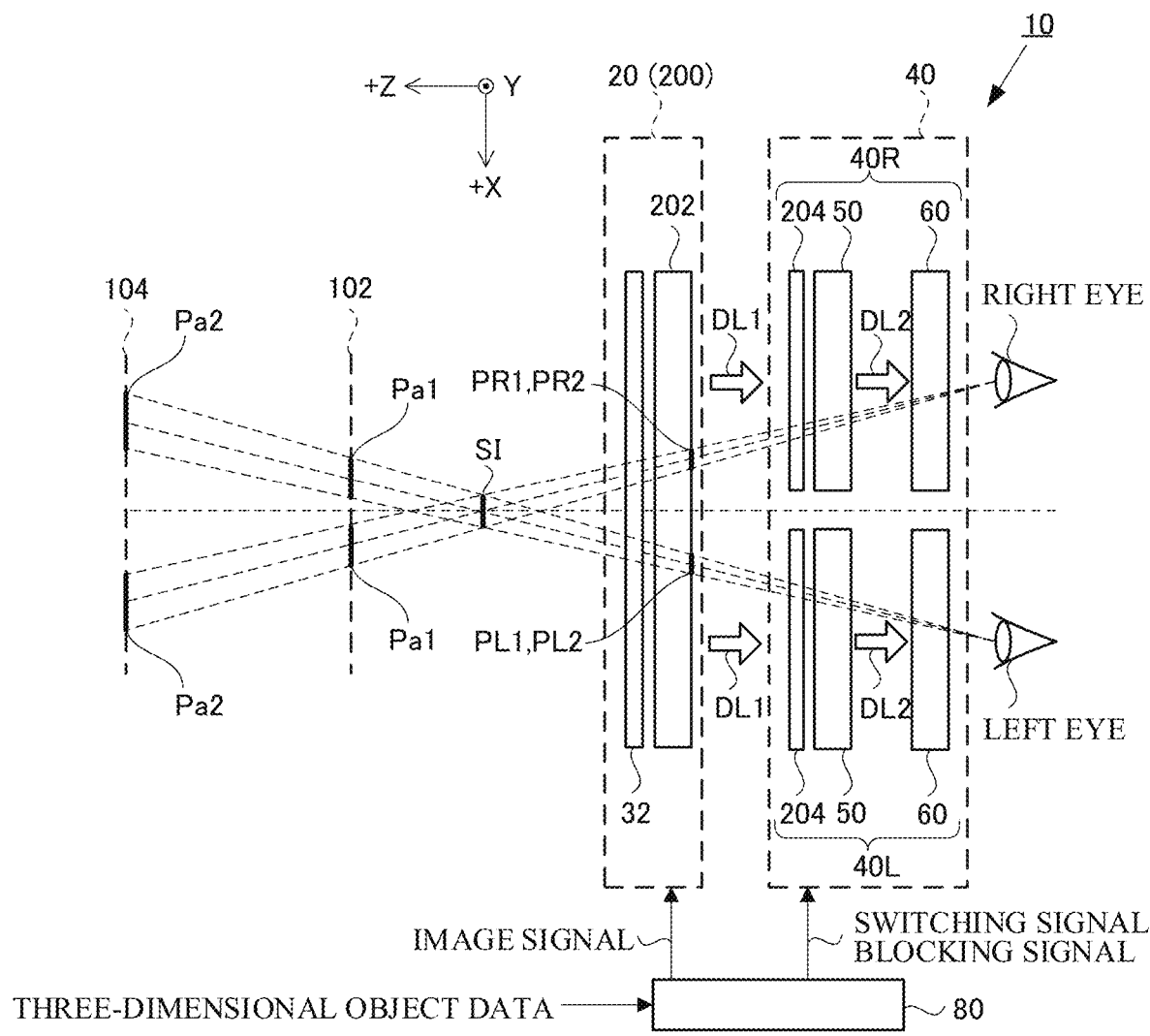
FIG. 29 is a schematic drawing illustrating a three-dimensional-image display device according to a modified example.

In the embodiments, the display unit 20 includes the right eye display device 20R and the left eye display device 20L. However, a configuration is possible in which the display unit 20 displays parallax images using one display device. For example, a configuration is possible in which, as illustrated in FIG. 29, the display unit 20 includes a display device 200 that sequentially displays, in time divisions, the first right eye image PR1, the second right eye image PR2, the first left eye image PL1, and the second left eye image PL2. The display device 200 includes a liquid crystal display panel 202 and a light source 32. In this case, the right eye lens unit 40R and the left eye lens unit 40L include a liquid crystal shutter 204 that blocks the display light DL1 emitted from the display device 200. The liquid crystal shutter 204 of the right eye lens unit 40R blocks the display light DL1 of the left eye image on the basis of a blocking signal from the control unit 80. The liquid crystal shutter 204 of the left eye lens unit 40L blocks the display light DL1 of the right eye image on the basis of a blocking signal from the control unit 80. The right eye lens unit 40R and the left eye lens unit 40L switch the focal distance in accordance with the right eye image or the left eye image to be displayed on the display device 200.

Figure 30:
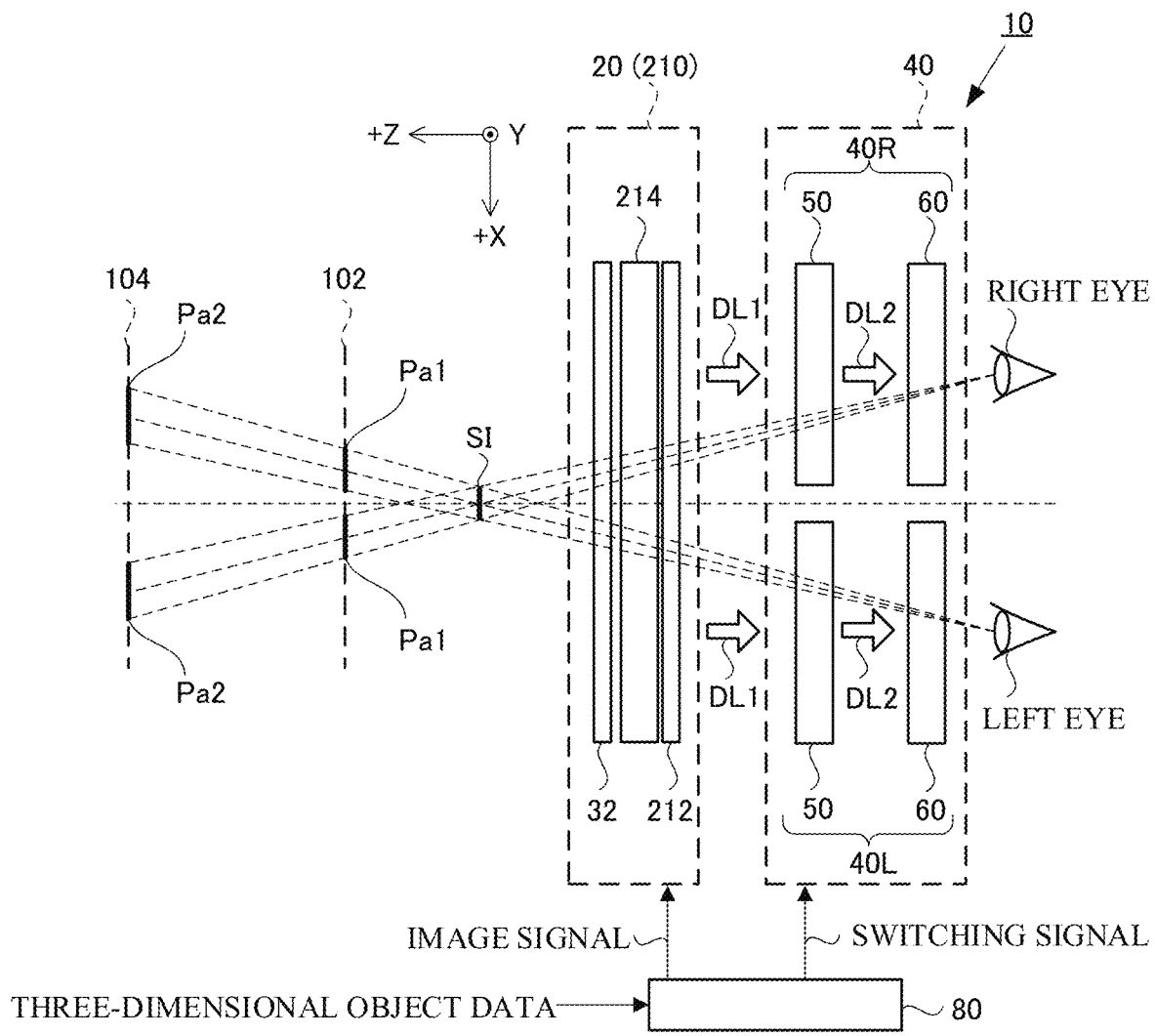
FIG. 30 is a schematic drawing illustrating a three-dimensional-image display device according to a modified example.

As illustrated in FIG. 30, a configuration is possible in which the display unit 20 includes a parallax barrier-type or lenticular lens-type display device 210. In one example, the display device 210 spatially separates, by a lenticular lens 212, the parallax images displayed on the liquid crystal display panel 214 into a right eye image and a left eye image. The display light DL1 of the right eye image enters the right eye lens unit 40R, and the display light DL1 of the left eye image enters the left eye lens unit 40L.

The polarization switcher 50 of the variable focus lens unit 40 is not limited to a TN liquid crystal element. A configuration is possible in which the polarization switcher 50 is implemented as a lead lanthanum zirconate titanate (PLZT) element, an element that uses the Faraday effect, or the like.

Furthermore the configuration of the right eye lens unit 40R and the left eye lens unit 40L is not limited to one set of a polarization switcher 50 and a polarized bifocal lens 60, or the liquid crystal lens 600. For example, a configuration is possible in which the right eye lens unit 40R and the left eye lens unit 40L are implemented as liquid lenses that use electrowetting and for which the focal distance changes due to the applied voltage. Furthermore, in Embodiment 5, a configuration is possible in which the right eye lens unit 40R and the left eye lens unit 40L switch the focal distance to three steps by two sets of a polarization switcher 50 and a polarized bifocal lens 60.

It is sufficient that the three-dimensional-image display device 10 respectively displays virtual images of a plurality of parallax images on a plurality of display surfaces. In particular, the three-dimensional-image display device 10 can further suppress burn-in of the display in cases in which the number of display surfaces is an odd number of three or greater, as in Embodiment 5.

In Embodiment 1, the three-dimensional object data is inputted into the control unit 80 from an external device, and the display surface data and the perspective data are stored in the storage 82. However, a configuration is possible in which the display surface data and/or the perspective data is inputted, together with the three-dimensional object data, into the control unit 80 from an external device.

A configuration is possible in which the control unit 80 is included in an independent device including a CPU, a RAM, a ROM, and the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A three-dimensional-image display device, comprising:
a display unit that sequentially displays parallax images that are stereoscopically viewable;
a variable focus lens unit in which a focal distance for display light of each of the parallax images switches, and that forms a virtual image of each of the parallax images on each of a plurality of display surfaces positioned in a depth direction from a perspective of an observer; and
a control unit that distributes, in accordance with a position of a stereoscopic image formed from the virtual images of the parallax images, a luminance of the stereoscopic image to a luminance of the parallax images, wherein
the control unit distributes the luminance of the stereoscopic image to the luminance of at least one of the parallax images, and
in a case in which, among the plurality of display surfaces, the display surface for which a distance from the observer is closest is defined as a closest display surface and, among the plurality of display surfaces, the display surface for which the distance from the observer is farthest is defined as a farthest display surface,
the control unit
in a case in which the position of the stereoscopic image is a first position positioned between the closest display surface and the farthest display surface, changes, in accordance with the distance between the observer and the stereoscopic image, a distribution ratio for distributing the luminance of the stereoscopic image to the luminance of the parallax images, and
in a case in which the position of the stereoscopic image is a second position at which the distance from the observer is less than or equal to the distance between the observer and the closest display surface, or is a third position at which the distance from the observer is greater than or equal to the distance between the observer and the farthest display surface, sets the distribution ratio to constant.

2. A three-dimensional-image display device, comprising:
a display unit that sequentially displays two parallax images that are stereoscopically viewable;
a variable focus lens unit in which a focal distance for display light of the two parallax images switches, and that forms a virtual image of each of the parallax images on each of two display surfaces positioned in a depth direction from a perspective of an observer; and
a control unit that distributes, in accordance with a position of a stereoscopic image formed from the virtual images of the parallax images, a luminance of the stereoscopic image to a luminance of the parallax images, wherein
the control unit distributes the luminance of the stereoscopic image to the luminance of at least one of the parallax images, and
in a case in which, among the two display surfaces, the display surface for which a distance from the observer is closest is defined as a closest display surface and, among the two display surfaces, the display surface for which the distance from the observer is farthest is defined as a farthest display surface,
the control unit
in a case in which the position of the stereoscopic image is a first position positioned between the closest display surface and the farthest display surface, changes, in accordance with the distance between the observer and the stereoscopic image, a distribution ratio for distributing the luminance of the stereoscopic image to the luminance of the parallax images, and
in a case in which the position of the stereoscopic image is a second position at which the distance from the observer is less than or equal to the distance between the observer and the closest display surface, or is a third position at which the distance from the observer is greater than or equal to the distance between the observer and the farthest display surface, sets the distribution ratio to constant.

3. The three-dimensional-image display device according to claim 1, wherein in a case in which the position of the stereoscopic image is one selected from the second position and the third position, a proportion distributed to the luminance of the parallax images is greater than zero.

4. The three-dimensional-image display device according to claim 2, wherein in a case in which the position of the stereoscopic image is one selected from the second position and the third position, a proportion distributed to the luminance of the parallax images is greater than zero.

5. The three-dimensional-image display device according to claim 1, wherein
the display unit includes a liquid crystal display panel that sequentially displays one image among the parallax images, a right eye image forming each of the parallax images, and a left eye image forming each of the parallax images, and
in a case in which the image is displayed on the liquid crystal display panel by two consecutive frames, a polarity of a voltage written to each pixel of the liquid crystal display panel is inverted at each writing.

6. The three-dimensional-image display device according to claim 2, wherein
the display unit includes a liquid crystal display panel that sequentially displays one image among the parallax images, a right eye image forming each of the parallax images, and a left eye image forming each of the parallax images, and
in a case in which the image is displayed on the liquid crystal display panel by two consecutive frames, a polarity of a voltage written to each pixel of the liquid crystal display panel is inverted at each writing.

7. The three-dimensional-image display device according to claim 1, wherein
the display unit includes a liquid crystal display panel that sequentially displays one image among the parallax images, a right eye image forming each of the parallax images, and a left eye image forming each of the parallax images, and
in a case in which each of the images is sequentially displayed on the liquid crystal display panel by each of consecutive frames, in the displaying of the consecutive images, a polarity of a voltage written to each pixel of the liquid crystal display panel is identical and, when displaying the next consecutive images, the polarity of the voltage written to each pixel of the liquid crystal display panel is inverted.

8. The three-dimensional-image display device according to claim 2, wherein
the display unit includes a liquid crystal display panel that sequentially displays one image among the parallax images, a right eye image forming each of the parallax images, and a left eye image forming each of the parallax images, and
in a case in which each of the images is sequentially displayed on the liquid crystal display panel by each of consecutive frames, in the displaying of the consecutive images, a polarity of a voltage written to each pixel of the liquid crystal display panel is identical and, when displaying the next consecutive images, the polarity of the voltage written to each pixel of the liquid crystal display panel is inverted.

9. The three-dimensional-image display device according to claim 1, wherein
a number of the plurality of display surfaces is an odd number of three or greater,
the display unit includes a liquid crystal display panel that sequentially displays one image among the parallax images, a right eye image forming each of the parallax images, and a left eye image forming each of the parallax images, and
in a case in which each of the images is sequentially displayed on the liquid crystal display panel by each of consecutive frames, a polarity of a voltage written to each pixel of the liquid crystal display panel is inverted at each frame.

10. The three-dimensional-image display device according to claim 1, wherein
in a case in which the position of the stereoscopic image is the second position, the control unit displays one of the parallax images on the closest display surface and displays another one of the parallax images on another of the display surfaces except for the closest display surface and, also, controls a proportion distributed to the luminance of the parallax image displayed on the closest display surface to be greater than or equal to a proportion distributed to the luminance of the parallax image displayed on the other display surface, and
in a case in which the position of the stereoscopic image is the third position, the control unit displays one of the parallax images on the farthest display surface and displays another one of the parallax images on another of the display surfaces except for the farthest display surface and, also, controls a proportion distributed to the luminance of the parallax image displayed on the farthest display surface to be greater than or equal to a proportion distributed to the luminance of the parallax image displayed on the other display surface.

11. The three-dimensional-image display device according to claim 2, wherein
in a case in which the position of the stereoscopic image is the second position, the control unit displays one of the parallax images on the closest display surface and displays another one of the parallax images on another of the display surfaces except for the closest display surface and, also, controls a proportion distributed to the luminance of the parallax image displayed on the closest display surface to be greater than or equal to a proportion distributed to the luminance of the parallax image displayed on the other display surface, and
in a case in which the position of the stereoscopic image is the third position, the control unit displays one of the parallax images on the farthest display surface and displays another one of the parallax images on another of the display surfaces except for the farthest display surface and, also, controls a proportion distributed to the luminance of the parallax image displayed on the farthest display surface to be greater than or equal to a proportion distributed to the luminance of the parallax image displayed on the other display surface.

12. An image generation device comprising:
a luminance calculator that calculates a distribution ratio for distributing, based on a position of a stereoscopic image of a display subject and a position of each of a plurality of display surfaces on which each virtual image of parallax images forming the stereoscopic image is displayed, a luminance of the stereoscopic image to a luminance of the parallax images; and
a parallax image generator that generates, based on the distribution ratio calculated by the luminance calculator, parallax image data expressing the parallax images, wherein in a case in which, among the plurality of display surfaces, the display surface for which a distance from an observer is closest is defined as a closest display surface and, among the plurality of display surfaces, the display surface for which the distance from the observer is farthest is defined as a farthest display surface, the luminance calculator in a case in which the position of the stereoscopic image is a first position positioned between the closest display surface and the farthest display surface, changes, in accordance with the distance between the observer and the stereoscopic image, the distribution ratio for distributing the luminance of the stereoscopic image to the luminance of the parallax images, and in a case in which the position of the stereoscopic image is a second position at which the distance from the observer is less than or equal to the distance between the observer and the closest display surface, or is a third position at which the distance from the observer is greater than or equal to the distance between the observer and the farthest display surface, sets the distribution ratio to constant.

\* \* \* \* \*